US011509519B2

(12) United States Patent
Siomina et al.

(10) Patent No.: US 11,509,519 B2
(45) Date of Patent: Nov. 22, 2022

(54) RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/640,098

(22) PCT Filed: Aug. 22, 2018

(86) PCT No.: PCT/IB2018/056372
§ 371 (c)(1),
(2) Date: Feb. 19, 2020

(87) PCT Pub. No.: WO2019/038700
PCT Pub. Date: Feb. 28, 2019

(65) Prior Publication Data
US 2021/0135926 A1   May 6, 2021

Related U.S. Application Data

(60) Provisional application No. 62/548,459, filed on Aug. 22, 2017.

(51) Int. Cl.
*H04L 41/0654* (2022.01)
*H04L 5/00* (2006.01)
(Continued)

(52) U.S. Cl.
CPC ........ *H04L 41/0654* (2013.01); *H04L 5/0048* (2013.01); *H04L 43/16* (2013.01);
(Continued)

(58) Field of Classification Search
CPC ..... H04L 4/0654; H04L 5/0048; H04L 43/16; H04W 24/08; H04W 72/085; H04W 76/28
See application file for complete search history.

(56) References Cited

U.S. PATENT DOCUMENTS 10,171,215 B1 * 1/2019 Oroskar ............... H04L 5/0048
2012/0309398 A1   12/2012 Watanabe
(Continued)

FOREIGN PATENT DOCUMENTS

JP   2010 512098 A    4/2010
KR   20080054865 A    6/2008
(Continued)

OTHER PUBLICATIONS

3GPP TSG-RAN WG4 Meeting #84; Berlin, Germany; Source: Intel Corporation; Title: On RRM requirement impact for CRS-IM (R4-1707421)—Aug. 21-25, 2017.
(Continued)

*Primary Examiner* — Ayanah S George
(74) *Attorney, Agent, or Firm* — Baker Botts, LLP

(57) ABSTRACT

Embodiments herein relate to a method performed by a radio network node (12,13) for handling communication of a wireless device (10) in a wireless communication network (1). The radio network node (12,13) is configured to provide a serving cell for the wireless device (10) on a lean carrier where reference signals are transmitted with a bandwidth that is variable between a first bandwidth and a second bandwidth, the second bandwidth being narrower than the first bandwidth, and wherein the wireless device (10) is configured with a discontinuous reception cycle. The radio network node transmits reference signals over a bandwidth that alternates between the first bandwidth and the second bandwidth in accordance with the discontinuous reception cycle configured for the wireless device (10). The radio
(Continued)

network node further obtains an indication from the wireless device (10) or from a second radio network node (12,13), which indication indicates that a signal strength or quality of the serving cell for the wireless device (10) is below a threshold; and transmits, in response to the obtained indication, one or more reference signals over the first bandwidth.

14 Claims, 14 Drawing Sheets

(51) Int. Cl.
    *H04L 43/16*     (2022.01)
    *H04W 24/08*     (2009.01)
    *H04W 72/08*     (2009.01)
    *H04W 76/28*     (2018.01)

(52) U.S. Cl.
    CPC ......... *H04W 24/08* (2013.01); *H04W 72/085* (2013.01); *H04W 76/28* (2018.02)

(56) References Cited

U.S. PATENT DOCUMENTS

2015/0087317 A1* 3/2015 Yiu ..................... H04L 5/0055
                                                      455/441
2016/0212752 A1* 7/2016 Xu ..................... H04L 5/0053

FOREIGN PATENT DOCUMENTS

KR       10 1312876 B1     9/2013
WO       2016 071010 A1     5/2016

OTHER PUBLICATIONS

3GPP TSG-RAN WG4 Meeting #84; Berlin, Germany; Source: MediaTek Inc.; Title: Legacy impacts on RLM and RACH Procedures (R4-1707869)—Aug. 21-25, 2017.

3GPP TSG-RAN WG4 Meeting #84; Berlin, Germany; Source: Nokia, Nokia Shanghai Bell; Title: Network Based CRS Mitigation Case Study (R4-1708335)—Aug. 21-25, 2017.

3GPP TSG RAN WG4 Meeting #84bis; Dubrovnik, Croatia; Source: Ericsson; Title: Network-based CRS Interference mitigation for legacy UE in RRC_Connected (R4-1711302)—Oct. 9-13, 2017.

3GPP TSG RAN Meeting #76; West Palm Beach, USA; Source: Ericsson; Title: New LTE WI on UE requirements for network-based CRS mitigation (RP-171408)—Jun. 5-8, 2017.

PCT International Search Report for International application No. PCT/IB2018/056372—dated Jan. 2, 2019.

PCT Written Opinion of the International Searching Authority for International application No. PCT/IB2018/056372—dated Jan. 2, 2019.

Examination Report issued for Government of India for Application No. 202017006638—dated Mar. 19, 2021.

\* cited by examiner

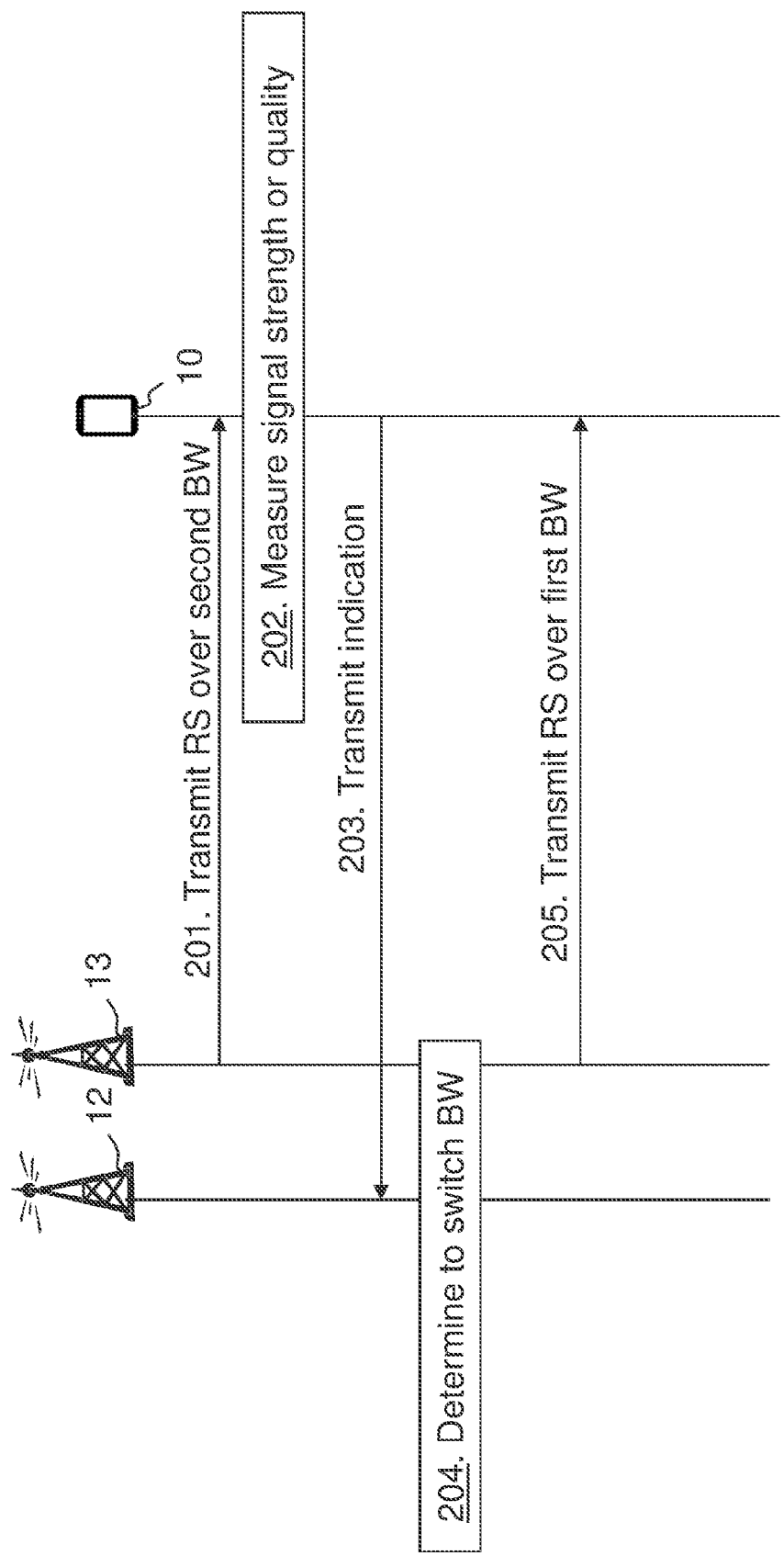

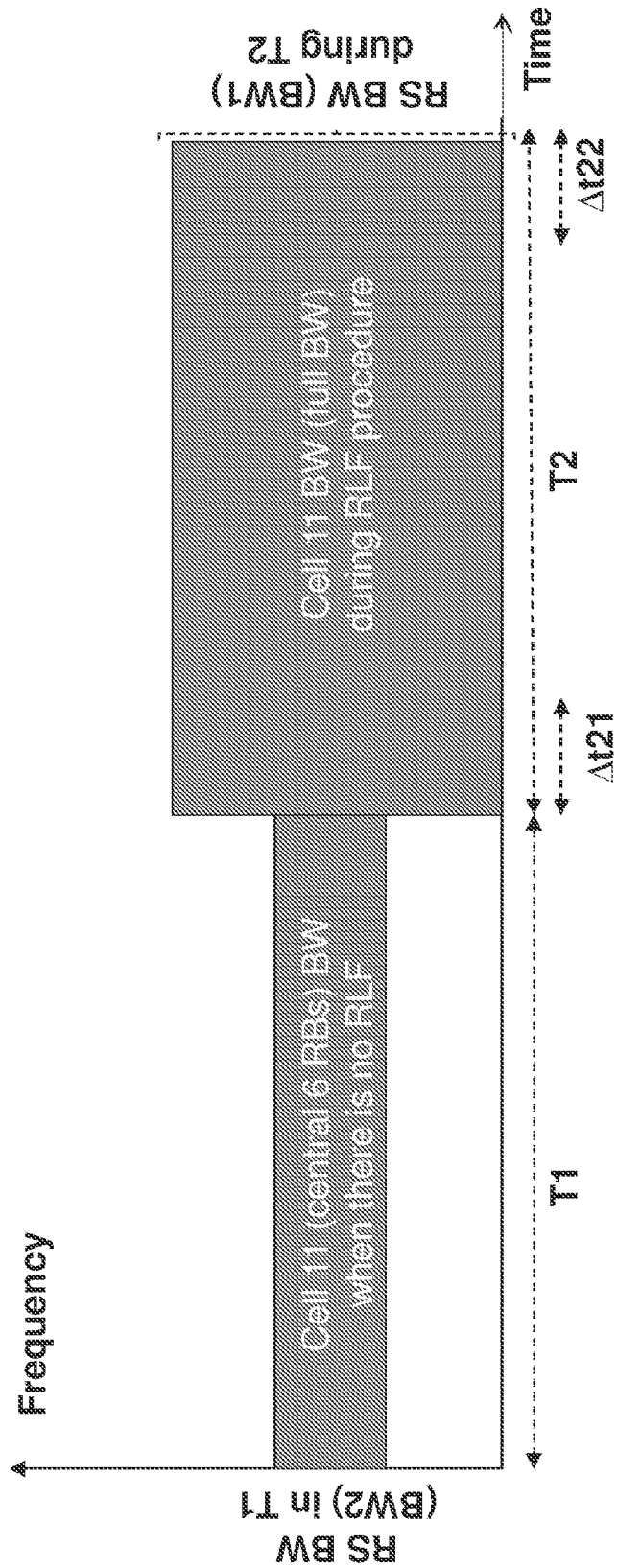
Figure 5: An example of second BW (BW2) and first BW configurations (BW1) when UE in cell1 is not in RLF and during the UE's RLF procedure respectively.

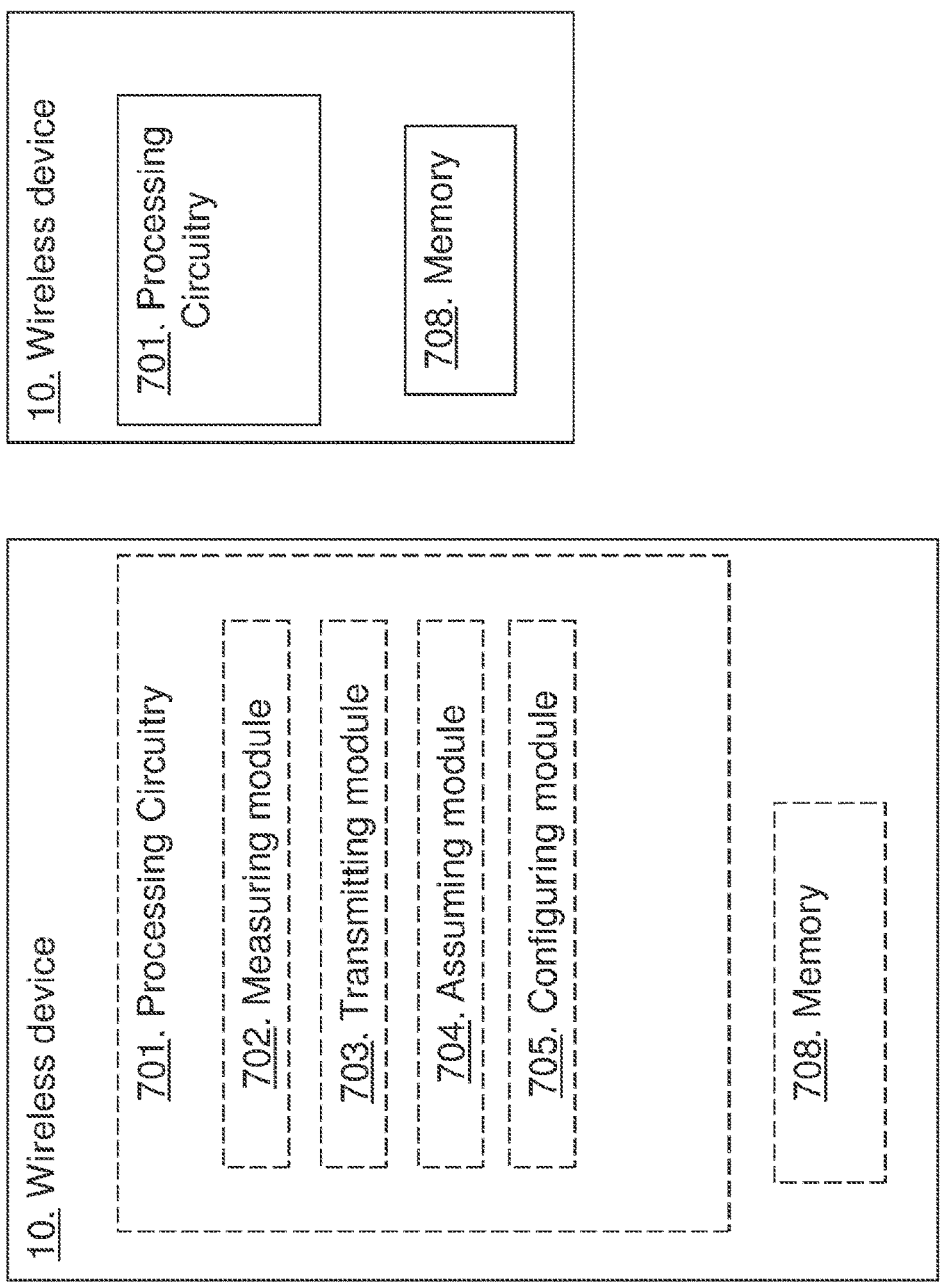
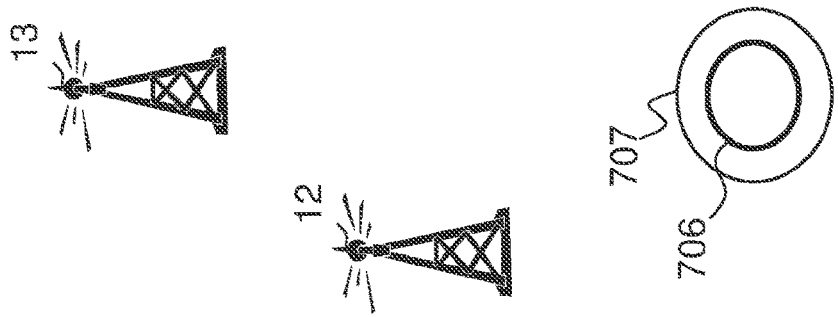
Fig. 7

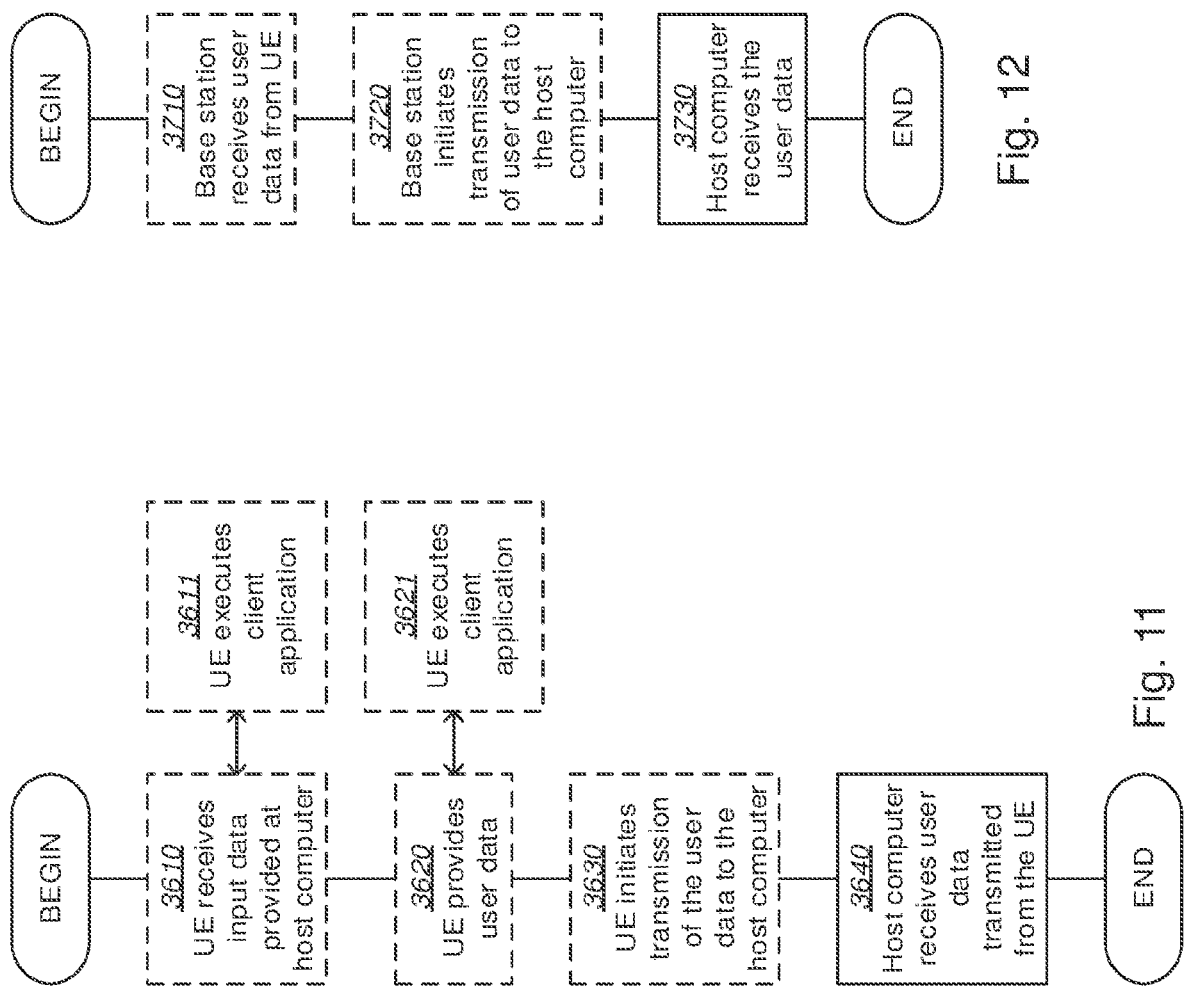

RADIO NETWORK NODE, WIRELESS DEVICE AND METHODS PERFORMED THEREIN

PRIORITY

This nonprovisional application is a U.S. National Stage Filing under 35 U.S.C. § 371 of International Patent Application Serial No. PCT/IB2018/056372 flied Aug. 22, 2018 and entitled "RADIO NETWORK NODE, WIRELESS DEVICE AND METHODS PERFORMED THEREIN" which claims priority to U.S. Provisional Patent Application No. 62/548,459 flied Aug. 22, 2017 both of which are hereby incorporated by reference in their entirety.

TECHNICAL FIELD

Embodiments herein relate to a wireless device, a radio network node and methods performed therein for communication. Furthermore, a computer program product and a computer readable storage medium are also provided herein. In particular, embodiments herein relate to handling communication between the wireless device and a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a gNodeB, a NodeB, or an eNodeB. A service area or cell area is a geographical area where radio coverage is provided by the radio network node. The radio network node communicates over an air interface operating on radio frequencies with wireless devices within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UTRAN, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Reduction of power consumption is important for wireless devices using battery or an external power supply and its importance increases with the continued growth of device populations and more demanding use cases. The importance can be illustrated by the following scenarios, e.g.:

For Machine to Machine (M2M) use cases like sensors that run on battery it is a major cost to on site exchange, or charge, the batteries for a large amount of wireless devices and the battery lifetime may even determine the wireless device's lifetime if it is not foreseen to charge or replace the battery;

Even for scenarios where wireless devices may consume power from an external power supply, it may be desirable to consume less power for energy efficiency purposes.

To facilitate reduction of power consumption in the wireless device, 3GPP defined Discontinuous reception (DRX) operation for wireless devices in Radio Resource Control (RRC) states or modes such as RRC_CONNECTED state or mode and RRC_IDLE state or mode, and recently also defined eDRX operation for wireless devices in RRC_CONNECTED mode and RRC_IDLE mode in LTE, as well as eDRX operation for wireless devices in RRC_IDLE mode in UTRA.

To reduce power consumption in radio network nodes such as eNodeBs, a Work Item (WI) on network-based Cell-specific Reference Signal (CRS) mitigation was approved in RP-171408, "New Work Item on UE requirements for network-based CRS mitigation for LTE", Ericsson, 3GPP RAN #76, June 2017.

Network-Based CRS Interference Mitigation

Right from the start in Release 8 (Rel-8), LTE has been designed to rely on CRSs, which are transmitted using full system bandwidth and in all downlink (DL) subframes of an LTE radio frame. CRS serves quite many important purposes for wireless devices to perform measurements such as for cell search, cell mobility, time/frequency synchronization, channel estimation and radio resource management.

However, currently CRS is transmitted independently of the actual load in the network or cell and as such it causes a considerable interference floor in cellular networks. Especially in times of low and medium network load, transmitting less CRS leads to lower inter-cell interference levels, which directly results in significantly higher data rates for the wireless devices in the network. Network-based CRS mitigation is especially powerful when being combined with higher order modulation, e.g., 256 Quadrature Amplitude Modulation (QAM), since the cell coverage area for higher order modulation is then significantly increased. In addition, the always-on CRS transmissions require radio network nodes to stay 'on' all the times, whereas network-based CRS mitigation allows radio network nodes to save energy.

Removing CRS completely, e.g., as it was done for DL Licensed Assisted Access (LAA) using Frame Structure 3 and as it has been envisioned for the 5G New Radio, (NR) would have the greatest effect but it renders the LTE carrier non-backwards compatible meaning that legacy wireless devices would not be able to use such a carrier. However, CRS can also be reduced cautiously and selectively such that legacy wireless devices can still be served and that inter-cell interference can be significantly reduced.

The approved WI on network-based CRS mitigation also enable reduction of inter-cell interference caused by CRS see RP-171408, "New Work Item on UE requirements for network-based CRS mitigation for LTE", Ericsson, 3GPP RAN #76, June 2017.

For frequency domain CRS reduction one can distinguish between RRC IDLE and RRC CONNECTED mode operation. For supporting wireless devices in IDLE mode, CRS can be reduced to the inner 6 physical resource blocks (PRBs) as wireless devices can be configured to only use those PRBs for cell selection. However, during paging occasions, system information transmissions, and random access windows CRS has to be transmitted using full bandwidth. For supporting wireless devices in CONNECTED mode, also known as CONNECTED state, CRS has to be transmitted using full bandwidth whenever a UE is active. But for instance during (e)DRX sleep periods CRS is not needed and can be reduced.

Frequency domain CRS reduction can be accompanied by time domain CRS reduction by means of configuring Multi Broadband Single Frame Network (MBSFN) subframes, which contain CRS only in 1 or 2 out of 14 orthogonal frequency division multiplexing (OFDM)-symbols.

FIG. 1A illustrates an example operation with network-based CRS mitigation, where "muted CRS" refers to using the shortened CRS bandwidth, center 6 Resource Blocks (RB). Thus, CRS are periodically transmitted over a reduced bandwidth during wireless device inactive periods and over full bandwidth during wireless device active periods. There may also be a warm-up period before the wireless device active period, and a cool-down period after the wireless device active period, when transmission of CRS over full bandwidth may be required.

In carrier aggregation (CA) operation the wireless device is able to receive and/or transmit data to and from more than one serving cells. In other words, a CA capable wireless device can be configured to operate with more than one serving cell. The carrier of each serving cell is generally called a component carrier (CC). In simple words the component carrier (CC) means an individual carrier in a multi-carrier system. The term carrier aggregation (CA) is also called, e.g. interchangeably called, "multi-carrier system", "multi-cell operation", "multi-carrier operation", "multi-carrier" transmission and/or reception. This means that the CA is used for transmission of signaling and data in the uplink and downlink directions. One of the CCs is designated as the primary component carrier (PCC) or simply primary carrier or even anchor carrier. The remaining ones are designated as secondary component carriers (SCC) or simply secondary carriers or even supplementary carriers. The serving cell is interchangeably called primary cell (PCell) or primary serving cell (PSC). Similarly the secondary serving cell is interchangeably called secondary cell (SCell) or secondary serving cell (SSC).

In another multicarrier operation called dual connectivity (DC), the wireless device is configured with a Master Cell Group (MCG) and a Secondary Cell Group (SCG). Cell Group (CG) is a group of serving cells associated with either master radio network node such as a master eNB (MeNB) or secondary radio network node such as a secondary eNB (SeNB). Master Cell Group (MCG) is a group of serving cells associated with the MeNB, comprising the PCell and optionally one or more SCells. Secondary Cell Group (SCG) is a group of serving cells associated with the SeNB comprising PSCell (Primary Scell) and optionally one or more SCells.

The purpose of radio link monitoring (RLM) is to monitor a radio link quality of a serving cell of the wireless device and to use that information to decide whether the wireless device is in in-sync or out-of-sync with regards to that serving cell. In LTE RLM is carried out by the wireless device performing measurement on downlink reference symbols, such as CRS, in RRC_CONNECTED mode. If results of the RLM indicate a number of consecutive out of sync (OOS) indications then the wireless device may start a radio link failure (RLF) procedure and may declare RLF after the expiry of an RLF timer, e.g. T310. The actual wireless device procedure is carried out by comparing the estimated downlink reference symbol measurements to some target Block Error Rate (BLER), Qout and Qin. Qout and Qin correspond to BLER of hypothetical Physical Downlink Control Channel (PDCCH)/Physical Control Format Indicator Channel (PCFICH) transmissions from the serving cell. Examples of Qout and Qin are 10% and 2% respectively.

The current RLF procedure in LTE has two phases, as depicted in FIG. 1B. The first phase starts upon radio problem detection and leads to radio link failure detection. The second phase, e.g. Radio Resource Control (RRC) recovery, starts upon radio link failure detection or handover failure and leads to RRC_IDLE mode in case the RRC recovery fails.

For single carrier and CA, re-establishment is triggered when the PCell experiences RLF. The wireless device does not monitor the RLF of SCells, which are monitored by the radio network node.

For Dual Connectivity (DC), the first phase of the radio link failure procedure is supported for PCell and PSCell. Re-establishment is triggered when PCell experiences RLF. However, upon detecting RLF on the PSCell, the re-establishment procedure is not triggered at the end of the first phase. Instead, the wireless device informs the radio link failure of PSCell to the MeNB.

RLF can be triggered by layer 1 (L1), a.k.a. physical layer or PHY, or layer 2 (L2), which is then reported to layer 3 (L3). RLM is responsible for L1-triggering, upon receiving a number (N310) of consecutive "out-of-sync" indications from lower layers and no recovery, no "in-sync" indication. L2-triggering may be, e.g., upon indication from RLC that the maximum number of retransmissions has been reached or upon random access problem indication from media access control (MAC).

RLM is performed based on CRS, at least once every radio frame, when not configured with DRX, or periodically with DRX cycle, when configured with DRX, over the full cell bandwidth which is also the control channel bandwidth, e.g. PDCCH and PCFICH.

Upon start of T310 timer or T313 timer as specified in clause 5.3.11 in TS 36.331 v.14.0.0, the wireless device shall monitor the link of PCell or PSCell for recovery using the evaluation period and Layer 1 indication interval corresponding to the non-DRX mode until the expiry or stop of T310 timer or T313 timer. The transmitter power of the wireless device shall be turned off within 40 ms after expiry of T310 timer and the transmitter power of PSCell, if configured, shall be turned off within 40 ms after expiry of T313 timer as specified in clause 5.3.11 in TS 36.331 v.14.0.0. T310 is also called the RLF timer in that the RLF procedure starts upon triggering the RLF timer, which is triggered upon receiving N310 number of consecutive out-of-sync indications from its lower layers. When T310 timer expires then the RLF is declared. But T310 timer is reset upon receiving N311 number of consecutive in-sync indications from its lower layers.

Timers T310 and T313 are specified in 36.331 v.14.0.0 as follows:

| | | | |
|---|---|---|---|
| T310 NOTE1 NOTE2 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |
| T313 NOTE2 | Upon detecting physical layer problems for the PSCell i.e. upon receiving N313 consecutive out-of-sync indications from lower layers | Upon receiving N314 consecutive in-sync indications from lower layers for the PSCell, upon initiating the connection re-establishment procedure, upon SCG release and upon receiving RRCConnection Reconfiguration including MobilityControl InfoSCG | Inform E-UTRAN about the SCG radio link failure by initiating the SCG failure information procedure as specified in 5.6.13. |

NOTE1:
Only the timers marked with "NOTE1" are applicable to NB-IoT.
NOTE2:
The behaviour as specified in 7.3.2 applies The timers are configured by means of:
dedicated signaling with RRCConnectionReconfiguration or RRCConnectonReestablishment, in RLF-TimersAndConstants IE comprised in RadioResourceConfigDedicated, or
System Information Block 2 (SIB2).

The timers can have values: msO, ms50, ms100, ms200, ms500, ms1000, ms2000

In e.g. lean carrier operation the Bandwidth (BW) of the CRS in a cell can be reduced (e.g. to 6 RBs) at some times when there is no wireless device activity requiring full CRS BW. However the network is not always fully aware when and for which procedure the wireless device needs to receive CRS over larger BW or full BW in the cell. The wireless device performance may be degraded or the wireless device may fail certain operations if the CRS bandwidth is reduced in the serving or neighbor cell, especially when the wireless device is not aware of the CRS BW reduction. On the other hand to achieve sufficient system gain, e.g. higher system throughput, the network should not unnecessarily transmit CRS over full or larger BW in the cell. This is particularly challenging for the wireless device configured for multicarrier operation under lean carrier operation, since e.g. CA operation should ensure higher user throughput.

SUMMARY

An object of embodiments herein is to provide a mechanism for improving performance of the wireless communication network in an efficient manner.

According to an aspect the object is achieved by providing a method performed by a radio network node for handling communication of a wireless device in a wireless communication network. The radio network node is configured to provide a serving cell for the wireless device on a lean carrier where reference signals are transmitted with a bandwidth that is variable between a first bandwidth and a second bandwidth. The second bandwidth is narrower than the first bandwidth, and the wireless device is configured with a discontinuous reception cycle. The radio network node transmits reference signals over a bandwidth that alternates between the first bandwidth and the second bandwidth in accordance with the discontinuous reception cycle configured for the wireless device. The radio network node obtains an indication from the wireless device or from a second radio network node, which indication indicates that a signal strength or quality of the serving cell for the wireless device is below a threshold. The radio network node further transmits, in response to the obtained indication, one or more reference signals over the first bandwidth.

According to another aspect the object is achieved by providing a method performed by a wireless device for handling communication of the wireless device in a wireless communication network. The wireless device is served by a radio network node in a serving cell on a lean carrier where reference signals are transmitted with a bandwidth that is variable between a first bandwidth and a second bandwidth, the second bandwidth being narrower than the first bandwidth. The wireless device is configured with a discontinuous reception cycle. The wireless device receives, on the serving cell, reference signals that are assumed by the wireless device to have been transmitted by the radio network node over a bandwidth that alternates between the first bandwidth and the second bandwidth in accordance with the discontinuous reception cycle. The wireless device measures a signal strength or quality of the serving cell from the radio network node. The wireless device then receives, on the serving cell, one or more reference signals, wherein the wireless device assumes, in response to the measured signal strength or quality being below a threshold, the one or more reference signals to have been transmitted by the radio network node over the first bandwidth.

According to yet another aspect the object is achieved by providing a radio network node for handling communication of a wireless device in a wireless communication network. The radio network node is configured to provide a serving cell for the wireless device on a lean carrier where reference signals are transmitted with a bandwidth that is variable between a first bandwidth and a second bandwidth. The second bandwidth is narrower than the first bandwidth, and the wireless device is configured with a discontinuous reception cycle. The radio network node is configured to transmit reference signals over a bandwidth that alternates between the first bandwidth and the second bandwidth in accordance with the discontinuous reception cycle configured for the wireless device. Furthermore, the radio network node is configured to obtain an indication from the wireless device or from a second radio network node, which indication indicates that a signal strength or quality of the serving cell for the wireless device is below a threshold. The radio network node is further configured to transmit, in response to the obtained indication, one or more reference signals over the first bandwidth.

According to still another aspect the object is achieved by providing a wireless device for handling communication of the wireless device in a wireless communication network. The wireless device is configured to be served by a radio network node in a serving cell on a lean carrier where reference signals are transmitted with a bandwidth that is variable between a first bandwidth and a second bandwidth, the second bandwidth being narrower than the first bandwidth. The wireless device is configured with a discontinuous reception cycle. The wireless device is configured to receive, on the serving cell, reference signals that are assumed by the wireless device to have been transmitted by the radio network node over a bandwidth that alternates between the first bandwidth and the second bandwidth in accordance with the discontinuous reception cycle. The wireless device is configured to measure a signal strength or quality of the serving cell. The wireless device is further configured to receive, on the serving cell, one or more reference signals, wherein the wireless device is configured to assume, in response to the measured signal strength or quality being below a threshold, the one or more reference signals to have been transmitted by the radio network node over the first bandwidth.

It is furthermore provided herein a computer program product comprising instructions, which, when executed on at least one processor, cause the at least one processor to carry out any of the methods above, as performed by the radio network node or the wireless device respectively. It is additionally provided herein a computer-readable storage medium, having stored thereon a computer program product comprising instructions which, when executed on at least one processor, cause the at least one processor to carry out the method according to any of the methods above, as performed by the radio network node or the wireless device respectively.

Embodiments herein provide a manner of enabling lean carrier operation where the BW of the RS in a cell can be reduced while ensuring that reference signals are provided over a different bandwidth, e.g. a wider bandwidth, when the wireless device experiences or measures signal strength or quality of e.g. a low level. E.g. when the radio network node receives indication of RLF the radio network node transmits e.g. CRSs over the full BW. Thereby degradation of the performance due to failed RLM/RLF procedures because of non-available RS, e.g. CRS, can be avoided and thus performance of the wireless communication network as such is improved in an efficient manner.

BRIEF DESCRIPTION OF THE DRAWINGS

Embodiments will now be described in more detail in relation to the enclosed drawings, in which:

FIG. 2B is a combined signalling scheme and flowchart according to embodiments herein;

FIG. 5 illustrates transmissions of RS over different bandwidths (BW);

FIG. 7 is a block diagram depicting a wireless device according to embodiments herein;

FIGS. 9-12 are flowcharts illustrating methods implemented in a communication system including a host computer, a base station and a user equipment.

DETAILED DESCRIPTION

Figure 1A:
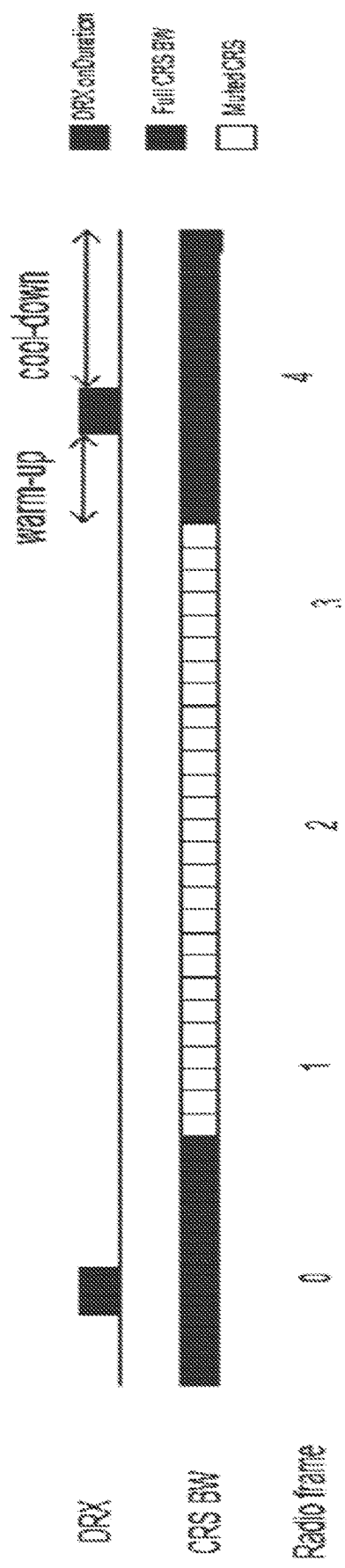
FIG. 1A is a schematic overview depicting transmission of reference signals according to prior art.
Figure 1B:
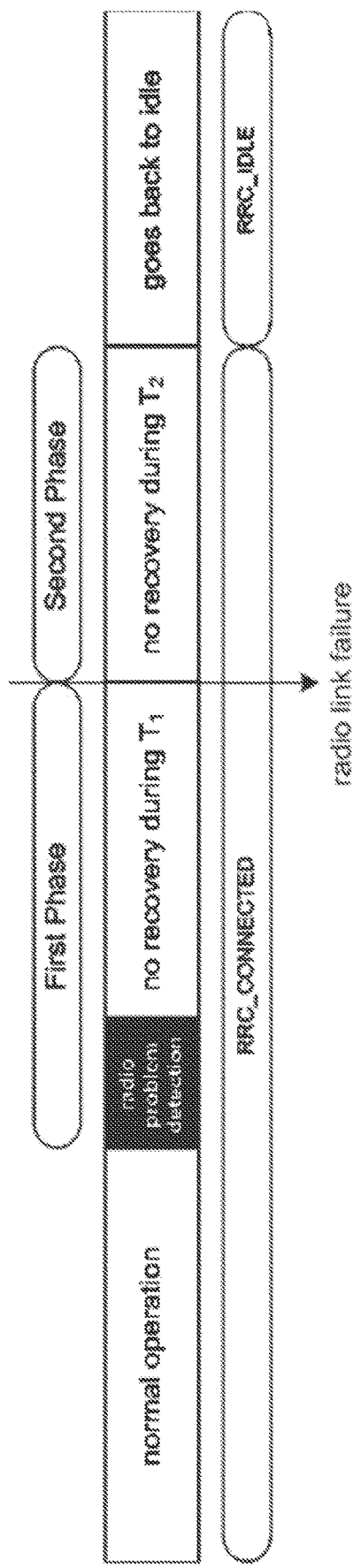
FIG. 1B is a schematic overview depicting a radio link failure process according to prior art.
Figure 2A:
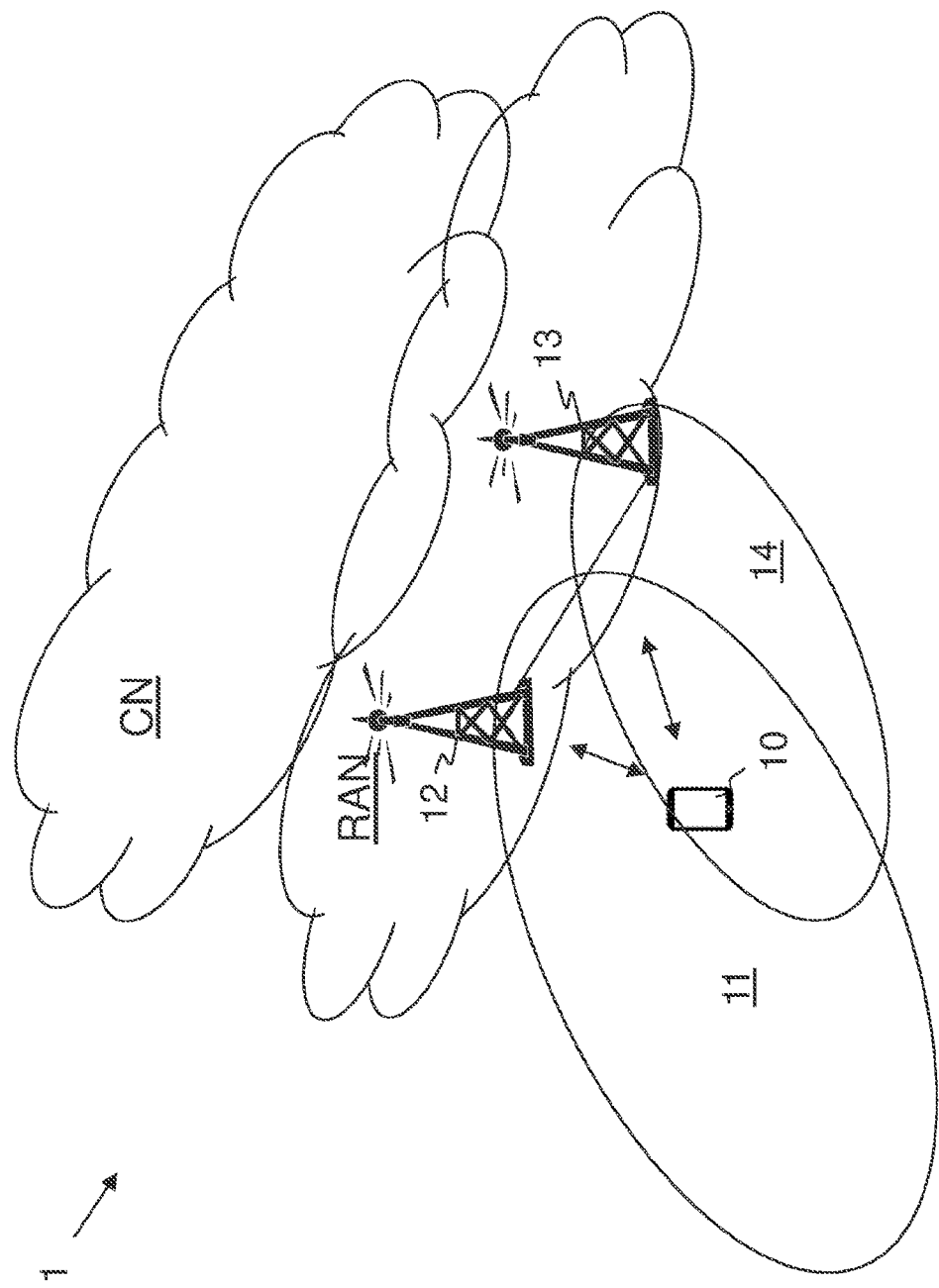
FIG. 2A is a schematic overview depicting a wireless communication network according to embodiments herein.

Embodiments herein relate to communication networks in general. FIG. 2A is a schematic overview depicting a wireless communication network 1. The communication network 1 comprises one or more RANs e.g. a first RAN (RAN1), connected to one or more CNs. The communication network 1 may use one or a number of different technologies, such as Wi-Fi, Long Term Evolution (LTE), LTE-Advanced, New Radio (NR) of 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments are applicable to 5G and also in further development of the existing communication systems such as e.g. 3G and LTE.

In the wireless communication network 1, wireless devices e.g. a wireless device 10 such as a mobile station, a non-access point (non-AP) STA, a STA, a user equipment and/or a wireless terminal, are connected via the one or more RANs, to the one or more CNs. It should be understood by those skilled in the art that "wireless device" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area.

The wireless communication network 1 comprises a first radio network node 12, or a radio network node 12 for short. The first radio network node 12 is exemplified herein as a RAN node providing radio coverage over a geographical area, a first service area 11, of a radio access technology (RAT), such as NR, LTE, UMTS, Wi-Fi or similar. The first radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the first radio network node 12 depending e.g. on the radio access technology and terminology used and may be denoted as a scheduling node, serving radio network node or primary serving radio network node providing a primary serving cell for the wireless device 10.

The wireless communication network 1 may further comprise a second radio network node 13. The second radio network node 13 is exemplified herein as a RAN node providing radio coverage over a geographical area, a second service area 14, of a radio access technology (RAT), such as NR, LTE, UMTS, Wi-Fi or similar. The second radio network node 13 may be denoted as a secondary node, secondary serving radio network node providing a secondary serving cell for the wireless device 10. It should be noted that a service area may be denoted as 'cell', beam, beam group or similar to define an area of radio coverage.

It should further be understood that the first and second service area may also be provided by a single radio network node such as the first radio network node 12 or the second radio network node 13.

When configured with Discontinuous reception (DRX), the wireless device 10 typically performs RLM during the ON duration periods (configured by the network and thus known to the network, which makes it possible to ensure full bandwidth CRS in those subframes), while when not configured with DRX the wireless device 10 is required to perform RLM at least once every radio frame (10 ms), in any DL subframe (and thus not known to the network), which means the network would have to always transmit full-bandwidth CRS when there is at least one wireless device in RRC_CONNECTED mode not configured with DRX.

More specifically, the problem addressed herein is that a wireless device configured with DRX is required to operate in a non-DRX mode, e.g., continuous channel monitoring, when bad link quality is determined, while it is the key assumption for the lean carrier that wireless device in RRC_CONNECTED configured with DRX do not require full bandwidth CRS except for a relatively short period, e.g., 1-4 subframes, warm-up period prior the configured DRX ON duration. This is explicitly stated in the standard as a wireless device behavior requirement:

Upon start of T310 timer or T313 timer as specified in clause 5.3.11 in TS 36.331 v.14.0.0, the wireless device 10 shall monitor the link of PCell or PSCell for recovery using the evaluation period and Layer 1 indication interval corresponding to the non-DRX mode until the expiry or stop of T310 timer or T313 timer. The transmitter power of the wireless device 10 shall be turned off within 40 ms after expiry of T310 timer and the transmitter power of PSCell if configured shall be turned off within 40 ms after expiry of T313 timer as specified in clause 5.3.11 in TS 36.331 v.14.0.0.

According to embodiments herein the radio network node 12 adapts a bandwidth of a reference signal (RS), e.g. CRS, transmitted in the first cell (cell 11) in which a lean carrier operation is used, based on a radio link quality of cell 11 experienced by at least N wireless devices (e.g., N=1, 2, . . ., which may be configurable or pre-defined or received in a message from another network node such a controlling network node). In the lean carrier operation considered and exemplified herein, in at least certain time resources cell 11 transmits reference signals, e.g. CRS, over a reduced bandwidth, denoted second bandwidth (BW2), and transmits RS over full cell1's BW, denoted first bandwidth (BW1), in another set of time resources; where BW2<BW1, and where BW1 is the bandwidth of cell 11. Examples of radio link quality are signal quality measurements performed by the wireless device 10 on at least signals of cell 11 e.g. any one or a combination of: Reference Signal Received Quality (RSRQ), Reference Signal—Signal to Interference plus Noise Ratio (RS-SINR), Signal to Interference plus Noise Ratio (SINR), Reference Signal Received Power (RSRP), Received Signal Strength Indicator (RSSI), etc.

The bandwidth of RS, e.g. CRS, transmitted by the first radio network node 12 (e.g., serving BS, MeNB, SeNB, etc.) in cell 11 is changed from BW2 to BW1 (BW1>BW2) upon determining that the radio link quality of cell 11 experienced by at least one wireless device is below a threshold. Otherwise if radio link quality of cell 11 experienced by all the wireless devices in cell 11 are equal to or larger than the threshold then the first radio network node 12 transmits RS over the reduced BW e.g. BW2. The first radio network node 12 configures the wireless device 10 to perform radio link measurement on signals of cell 11 and report the results to the first radio network node 12. The configured value of threshold (e.g. RS-SINR=−10 dB or RSRQ=−12 dB) corresponds to a radio link quality at which the wireless device 10 triggers or is expected to trigger a radio link failure operation. The above rule can be pre-defined or configured at the wireless device 10 by the first radio network node 12. The above method will enable the wireless device 10 to correctly estimate radio link quality over full BW of cell 11 when this wireless device 10 triggers or is close to triggering a radio link failure procedure or operation with regards to cell 11 with lean carrier operation.

The above rule, which requires cell 11 to adapt RS BW based on the wireless device 10 estimated radio link quality, is also applied in the wireless device operating in cell 11. For example, the wireless device 10 upon triggering a radio link failure operation with regards to cell 11 assumes that during the radio link failure procedure, cell 11 transmits RS (e.g. CRS) over the full cell's BW, e.g. BW1. The RS, e.g. CRS, is used by the wireless device 10 for performing the radio link monitoring procedure. This assumption in the wireless device 10 will enable the wireless device 10 to perform RLF operation over the full cell11's BW. This in turn enhances the radio link quality estimated by the wireless device 10 during the RLF procedure. This in turn may result in that the wireless device 10 may recover from RLF and therefore prevent the loss of the radio link in cell 11.

Embodiments herein relate to methods of adapting reference signal BW configuration based on the reported signal strength or quality and the corresponding methods in the wireless device. Embodiments herein provide: compliance of the lean carrier with legacy wireless device operation; No wireless device performance degradation on a lean carrier or in a cell performing CRS bandwidth adaptation due to failed RLM/RLF procedures because of non-available CRS; and no network performance degradation due to failed RLM/RLF procedures because of non-available CRS.

Furthermore, the lean carrier operation is applied in a cell when the wireless device 10 is configured with DRX or eDRX cycle. For example if the wireless device 10 is in a Radio Resource Control (RRC) connected state then the serving cell of that wireless device 10 transmits RS (e.g. CRS) over the entire bandwidth of the serving cell. In other words during OFF and ON durations of the DRX cycle the RS are transmitted over reduced BW and full BW respectively. This means that the radio network node transmits reference signals over a bandwidth that alternates between a first bandwidth, being used for transmission of reference signals during ON duration periods of the DRX cycle, and a second bandwidth, being used for transmission of reference signals during periods in-between the ON duration periods of the DRX cycle. The periods in-between the ON duration periods of the DRX cycle may be the parts or portions of the OFF duration periods that are not part of any warm-up or cool-down period.

FIG. 2B is a combined signaling scheme and flowchart according to some embodiments herein relating to a wireless device in a lean carrier operation and being served by a primary and a secondary serving cell.

Action 201. The radio network node 12, 13 transmits reference signals over the second bandwidth.

Action 202. The wireless device 10 measures a signal strength or quality of the serving cell from the radio network node 12, 13.

Action 203. The wireless device 10 may then transmit an indication such as the measurements to the radio network node 12, 13.

Action 204. The radio network node 12, 13 determines to switch to the first bandwidth based on the received indication e.g. indicating a RLF.

Action 205. The radio network node 12, 13 then transmits RS(s) over the first bandwidth.

Figure 2C:
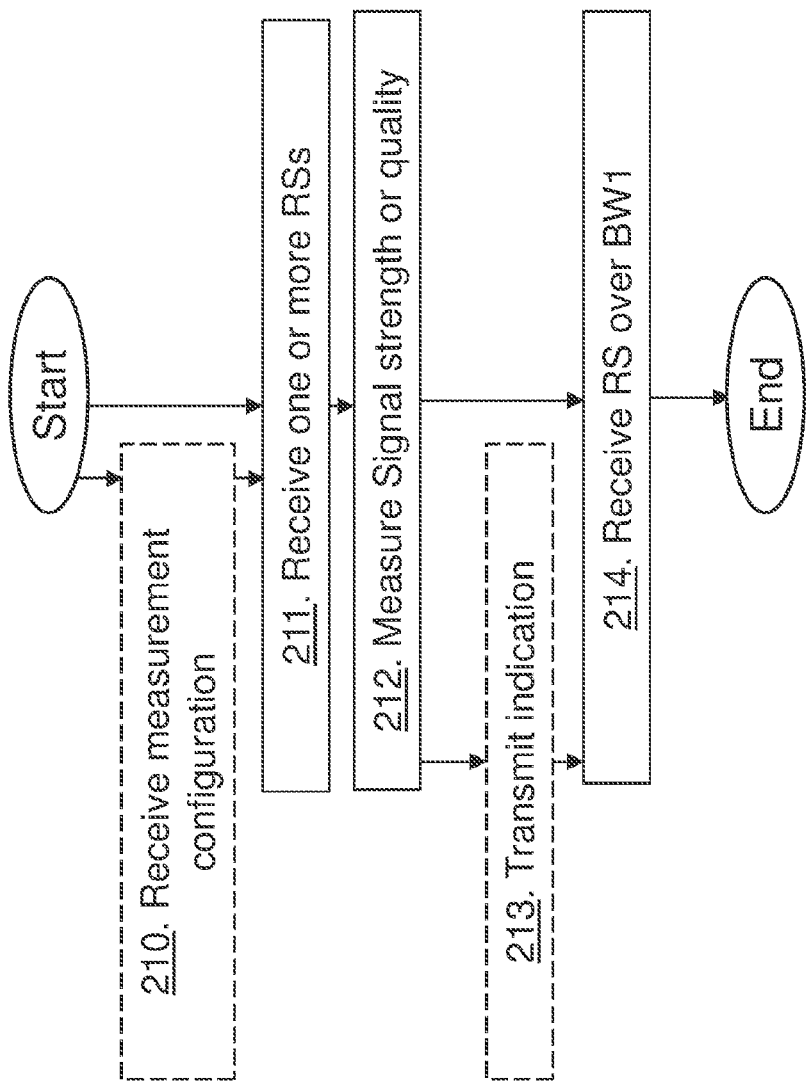
FIG. 2C is a flowchart depicting a method performed by a wireless device according to embodiments herein.

The method actions performed by the wireless device 10 for handling the communication of the wireless device 10 in the wireless communication network 1 according to embodiments herein will now be described with reference to a flowchart depicted in FIG. 2C. The actions do not have to be taken in the order stated below, but may be taken in any suitable order. Features performed in some embodiments are marked with a dashed line. The wireless device 10 is served by the radio network node in a serving cell on a lean carrier where reference signals are transmitted with a bandwidth that is variable between a first bandwidth and a second bandwidth, the second bandwidth being narrower than the first bandwidth. The wireless device 10 is configured with a discontinuous reception cycle and the radio network node transmits reference signals alternately over the first bandwidth and the second bandwidth in accordance with the discontinuous reception cycle configured for the wireless device. The term "alternately" here refers to a manner by which the bandwidth used for transmission of reference signals alternates between the first bandwidth being used for the transmission of reference signals that are transmitted during a first set of time resources and the second bandwidth being used for the transmission of reference signals that are transmitted during a second set of time resources. For example, the reference signals may be transmitted over the first bandwidth during ON duration periods of the discontinuous reception cycle and over the second bandwidth in-between the ON duration periods of the discontinuous reception cycle.

Action 210. The wireless device 10 may receive a measurement configuration message from the radio network node for setting up operations of the wireless device.

Action 211. The wireless device 10 receives, on the serving cell, reference signals that are assumed by the wireless device 10 to have been transmitted by the radio network node alternately over the first bandwidth and the second bandwidth, i.e. with a bandwidth that alternates between the first and second bandwidths, in accordance with the discontinuous reception cycle.

Action 212. The wireless device 10 measures a signal strength or quality of the serving cell from the radio network node.

Action 213. The wireless device 10 may transmit, in response to the measured signal strength or quality being below a threshold, an indication to the radio network node indicating the measured signal strength or quality. The threshold may be related to a (possible) radio link failure, RLF, e.g. by being set to a level where the wireless device 10 triggers, or is close to triggering, a radio link failure (RLF) procedure or operation with regards to the serving cell with lean carrier operation. The indication may be an indication of radio link failure or measurements from the wireless device 10. The wireless device 10 may, when the measured signal strength or quality is below the threshold, trigger the radio link failure (RLF) procedure or operation by starting an RLF timer. The wireless device 10 may start the RLF timer in response to or shortly after the measured signal strength or quality going below the threshold.

Action 214. The wireless device 10 receives, on the serving cell, one or more reference signals, wherein the wireless device 10 assumes, in response to the measured signal strength or quality being below the threshold, the one or more reference signals to have been transmitted by the radio network node over the first bandwidth. E.g. the wireless device 10 may thus assume, in response to the measured signal strength or quality being below the threshold, that the transmission, from the radio network node, of one or more reference signals is made over the first bandwidth. E.g. the wireless device may assume that the transmission, from the radio network node, of one or more reference signals is made over the first bandwidth over or for at least a duration during which the wireless device will perform an RLF procedure. The expected duration of RLF (T2) may correspond to the RLF timer (e.g. T310 or T313).

Figure 2D:
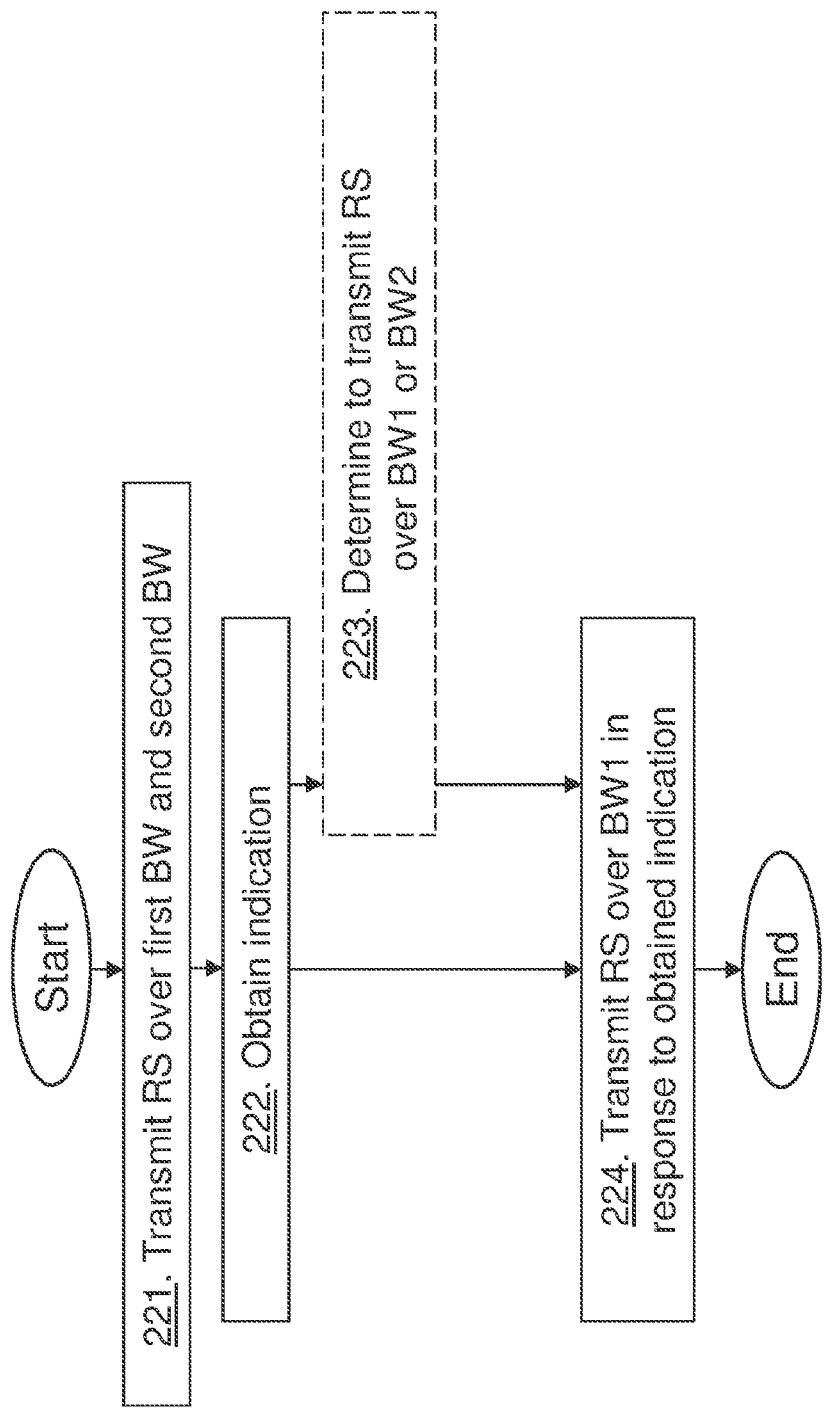
FIG. 2D a flowchart depicting a method performed by a radio network node according to embodiments herein.

The method actions performed by the radio network node, such as the first radio network node 12 or the second radio network node 13, for handling the communication of the wireless device in the wireless communication network 1 according to embodiments herein will now be described with reference to a flowchart depicted in FIG. 2D. The actions do not have to be taken in the order stated below, but may be taken in any suitable order. Actions performed in some embodiments are marked with dashed boxes. The radio network node is configured to provide a serving cell for the wireless device on a lean carrier where reference signals are transmitted with a bandwidth that is variable between a first bandwidth and a second bandwidth. The second bandwidth is narrower than the first bandwidth, and the wireless device is configured with a discontinuous reception cycle.

Action 221. The radio network node transmits reference signals alternately over the first bandwidth and the second bandwidth, i.e. with a bandwidth that alternates between the first and second bandwidths, in accordance with the discontinuous reception cycle configured for the wireless device 10. E.g. the reference signals are transmitted over the first bandwidth during ON duration periods of the discontinuous reception cycle and over the second bandwidth in-between the ON duration periods of the discontinuous reception cycle.

Action 222. The radio network node 12, 13 obtains the indication from the wireless device 10 or from a another or second radio network node, e.g. the respective other one of the first radio network node 12 or the second radio network node 13, which indication indicates that a signal strength or quality of the serving cell for the wireless device 10 is below the threshold. The threshold may be related to a possible RLF, e.g. by being set to a level where the wireless device 10 triggers, or is close to triggering, a radio link failure (RLF) procedure or operation with regards to the serving cell with lean carrier operation. The indication may be an indication of radio link failure. The indication may e.g. be measurements from the wireless device 10, an RLF flag, or may be uplink (UL) signals that the radio network node performs measurements on.

Action 223. The radio network node may determine to transmit the one or more reference signals over the first bandwidth or the second bandwidth based on the indication.

Action 224. The radio network node transmits, in response to the obtained indication, one or more reference signals over the first bandwidth. E.g. the one or more reference signals over the first bandwidth over or for at least a duration during which the wireless device will perform an RLF procedure. The radio network node 12 may transmit one or more reference signals over the first bandwidth when the signal strength or quality is below the threshold.

Figures 3, 4:
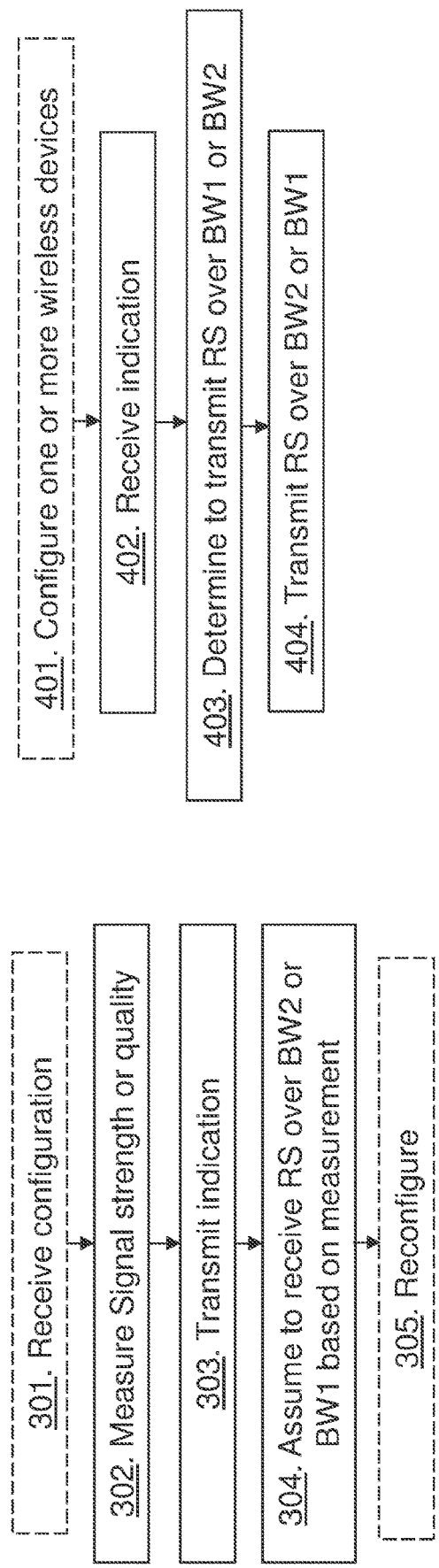
FIG. 3 is a flowchart depicting a method performed by a wireless device according to embodiments herein.
FIG. 4 is a schematic flowchart depicting a method performed by a radio network node according to embodiments herein.

Some actions performed by the wireless device 10 and the radio network node 12 are summarized below:

Methods performed by the wireless device 10 served by the first radio network node 12 and may also be served by the second radio network node 13, see FIG. 3, comprise:

Action 301. (in some embodiments): The wireless device 10 may receive a measurement configuration message from the radio network node 12 for performing a signal quality measurement on signals of the first cell 11 e.g. associated with lean carrier operation. For example, the wireless device 10 may be configured by the radio network node to perform one or more signal quality measurements on signals transmitted by the first cell 11 and to transmit the results of the performed measurements to the radio network node. The wireless device 10 may further be configured to transmit the results periodically and/or on event triggered basis. In the latter case the wireless device 10 will trigger an event when the measured signal quality of the first cell 11 falls below certain signal quality threshold (H).

Action 302 The wireless device 10 may according to some embodiments perform signal quality measurements on reference signals of the first cell 11.

Action 303. The wireless device 10 transmits an indication e.g. a result of the signal quality measurement to the first radio network node 12. The wireless device may transmit just the measurements or upon determining that the signal quality measurement is below a signal quality measurement threshold (H) transmitting the indication e.g. bit indicating that measurement is below H.

Action 304. Upon transmitting the indication (e.g. event) and/or results of the signal quality measurement to the radio network node, the wireless device 10 assumes that reference signals (RS), e.g. CRS, in cell 11 are transmitted over full bandwidth (BW1) of cell 11 during at least a time period over which the wireless device 10 performs a radio link failure (RLF) procedure, and using or configuring the receiver to use RS over full BW for performing the RLF procedure. The indication may also comprise an indication of the need for full BW, triggered by the measurement (e.g., when it is below a threshold).

Action 305. The wireless device 10 may after the termination of the RLF procedure assume that the RS are transmitted over a reduced bandwidth (BW2) in the cell 11 and using or reconfiguring the receiver to use the RS over reduced bandwidth for performing radio link monitoring (RLM) procedure, where BW2<BW1 e.g. BW1=50 RBs, BW2=6 RBs.

The wireless device 10 may while performing the actions above, also be required to meet one or more requirements related to RLM/RLF performance, e.g., correctly and in a timely manner indicate in-sync, out-of-sync, or declare RLF, without delays due to BW changes.

Thus, the wireless device 10 performs the configured signal quality measurement and may compare the results of the measurement with H. Based on the results comparison the wireless device 10 may perform the following actions:

If the signal quality measured on the first cell is below the threshold, H, then the wireless device 10 performs the following task:

Assume that the RS (e.g. CRS) are transmitted over full BW of first cell 11 over or for at least a duration during which the wireless device will perform RLF procedure. The expected duration of RLF (T2) corresponds to a RLF timer (e.g. T310). This may be configured by the radio network node at the wireless device and is therefore known to the wireless device 10 and thus uses the full BW of RS in the first cell 11 during the RLF procedure. This enables the wireless device 10 to estimate the radio link quality of the first cell 11 using RS over the full BW of the first cell 11 for detection of the out-of-sync and in-sync during the entire RLF procedure e.g. during second time interval, T2, as shown in FIG. 5 below.

After the termination of the RLF procedure (e.g. after T2) the wireless device 10 again assumes that RS are transmitted over reduced BW (e.g. BW2) except during DRX ON duration which is known to the wireless device 10. The wireless device 10 then start using RS over reduced BW for relevant procedure e.g. measurements etc. During this time the wireless device 10 does not perform RLF when the wireless device 10 has determined that the first cell 11 transmits RS over reduced BW. But if the signal quality measured on the first cell 11 is equal to or above the threshold, H, (as determined by the wireless device 10), then the wireless device 10 may further perform the following task:

The wireless device 10 may assume that the RS (e.g. CRS) are transmitted over reduced BW of the first cell 11 except during DRX ON duration. During this time over which the first cell 11 transmits RS over reduced BW as determined by the wireless device 10, the wireless device 10 does not perform any RLF procedure.

A rule can be defined in e.g. the standard to ensure that the wireless device 10 performs RLF procedure over full BW of the first cell 11 also when lean carrier operation is used in the first cell 11. For example, it can be specified that when a wireless device 10 is configured with a DRX and operates in a serving cell where lean carrier operation is used then wireless device 10 assumes that the RS (e.g. CRS) are transmitted over full bandwidth of the serving cell during the radio link failure procedure (e.g. when T310 is running) including X1 time resources and X2 time resources before the start of RLF procedure and after the end of RLF procedure respectively. Examples of X1 and X2 are 4 and 2 subframes respectively.

A rule may further be when the wireless device 10 is configured with the DRX and operates in the serving cell where lean carrier operation is used then wireless device estimates the radio link quality during the radio link failure procedure, e.g. when T310 is running, over the full BW of RS, e.g. CRS, transmitted in the serving cell.

The above rules can be applicable for each serving cell of the wireless device 10 (e.g. PCell, PSCell etc) on which RLM is performed and where lean carrier operation is used.

FIG. 4 is a flowchart depicting a method performed by the radio network node such as the first radio network node 12 for handling communication of the wireless device 10 in the wireless communication network 1. The actions do not have to be taken in the order stated below, but may be taken in any suitable order. Actions performed in some embodiments are marked with dashed boxes.

Action 401. The first radio network node 12 may configure at least N (e.g., N=1, 2, . . . ; can be pre-defined or configurable by this or another radio network node) wireless devices 10 to perform a signal quality measurement on signals transmitted by the first cell 11, which is associated with lean carrier operation so that cell transmits reference signals (e.g., CRS) over a reduced BW at least during a subset of time resources. Thus, the radio network node 12 configures one or more wireless devices to perform one or more signal quality measurements on signals transmitted by the first cell (cell 11). Cell 11 operates under lean carrier operation e.g. RS (e.g. CRS) are transmitted over the first bandwidth e.g. reduced BW (BW2) in DRX OFF and over the second bandwidth e.g. full cell BW (BW1) in DRX ON. Examples of the first cell 11 may be PCell, PSCell etc. The configuration message sent to the wireless device 10 may further contain additional information e.g. type of signal quality measurement (e.g. RS-SINR, RSRQ etc), carrier frequency of cell 11, cell ID of cell 11, type of event comparing cell 11 signal quality, signal quality threshold (H), type of reporting (e.g. period or event triggered), first bandwidth e.g. reduced bandwidth BW2, etc.

The term signal quality is also interchangeably called as radio link quality and it can comprise any of the metrics described herein, e.g.:
  a radio measurement result, e.g., RSRP, RSRQ, RS-SINR, SINR, CQI, CSI, RSSI,
  RLF, any indication that a wireless device may experience RLF soon,
  an indication that a wireless device is at the cell edge, an indication that the coverage level is below a threshold or the wireless device 10 goes from a first mode to a second mode, the mode being associated with coverage e.g. Coverage enhanced (CE) mode A to CE mode B,
  an indication that a wireless device is handed over to the cell of the radio network node and may have poor link quality, an indication of handover failure,
  load estimation or metric which is associated with poor link quality when the load is high e.g. above a threshold. The load may be estimated by the first radio network node 12 or another network node such as the second radio network node 13 indicating its load to the first radio network node 12 (high load in the second radio network node 13 generally implies also high interference to the first radio network node 12 and thus implicitly also higher load in the first radio network node 12),
  coverage level (e.g., normal or extended coverage, CE Mode A or CE Mode B, etc.)—low wanted signal level may indicate potential link problems too, especially in loaded networks with high interference.

The radio network node may further determine the parameter H before transmitting the measurement configuration message to the wireless device 10. The value of H may be associated with triggering of a radio link failure procedure by a wireless device in the first cell 11. Threshold or Parameter H may also depend on the coverage level, e.g., H1 for normal coverage and H2 (H2<H1) for extended coverage. For example, when the measured signal quality of the cell 11 falls below H, then the wireless device 10 is expected to start a radio link failure procedure. The value of H can be different for different types of signal quality measurement. For example H can be −10 dB for RS-SINR while it can be −16 dB for RSRQ. In one example the first radio network node 12 configures the wireless device 10 to report the results when the measured signal quality of cell 11 falls below H (otherwise not reporting) e.g. event triggered reporting. This mechanism is used to reduce signaling overheads. In another example the radio network node 12 configures the wireless device 10 to periodically report the results of the measured signal quality of the cell 11 to the first radio network node 12. In this approach the comparison between the measured signal quality reported to the first radio network node 12 and the threshold, H, is performed by the first radio network node 12 itself.

Action 402. The radio network node receives from the at least one or N wireless devices, i.e. at least the wireless device 10, the indication of one or more results of the measurement of signal strength or quality performed by the wireless device 10 on signals of the first cell 11. The indication may be the actual measurement value or data stating that the measurement is below the threshold.

Action 403. The radio network node may optionally then determine to transmit one or more reference signals such as CRS on the first or second bandwidth based on the indicated signal strength or quality. For example, upon determining that for N wireless devices (one or more wireless devices e.g. the wireless device 10):
  the received signal quality measurement is below a certain signal quality threshold (H), to transmit one or more reference signals (RS) (e.g. CRS) in the first cell 11 over the second bandwidth e.g. full bandwidth (BW1) during at least a time-period over which the wireless device 10 is performing or is expected to perform the radio link failure (RLF) procedure; or
  otherwise not changing the bandwidth of RS transmitted in the first cell 11, i.e. transmit the one or more RSs over the first bandwidth e.g. reduced bandwidth.

Action 404. The radio network node transmits the one or more RSs over the first or the second BW as determined. The radio network node may reconfigure the first cell 11 to transmit RS over the first bandwidth (BW2) after at least a certain time DeltaT and/or when the wireless device 10 has terminated or is expected to terminate the RLF procedure, where BW2<BW1 e.g. BW1=50 RBs, BW2=6 RBs. Thus, the first bandwidth is smaller than the second bandwidth. Thus, in case cell 11 is configured to transmit RS over full BW (as described above) then after the wireless device 10 has terminated or is expected to terminate the RLF, the radio network node may further reconfigure the cell 11 to reduce the RS BW (first BW e.g. BW2).

As an example of what is stated in action 403, if the signal quality measured on cell 11 is below the threshold, H, as determined by the wireless device 10 or the radio network node, then the radio network node may perform the following task:
  Configure cell 11 to transmit the RS over full BW, i.e. the second BW (BW1), of cell 11 over or for at least a duration during which at least one wireless device, such as the wireless device 10, is expected to perform RLF procedure. The expected duration of RLF (T2) corresponds to a RLF timer (e.g. T310). This is configured by the radio network node at the wireless device 10 and is therefore known to the radio network node. This will require cell 11 to increase the BW of RS from BW2 (first BW e.g. 6 RBs) to BW1 (second BW e.g. 50 RBs). This is shown in FIG. 5 where during T2 the BW for RS transmissions in cell 11 is increased to the full BW. The duration T2 also includes Δt21 and Δt22. The duration Δt21 and Δt22 are also called as warmup time and cool down time respectively. During Δt21 the wireless device 10 adapts its receiver parameters (e.g., related to received bandwidth, Fast Fourier Transform (FFT) size, etc.) for acquiring or receiving the RS from cell 11 or cell 14 in order to initiate the RLF procedure. Whereas during Δt22 the wireless device readjusts its receiver parameters to pre-RLF state (to reduce power consumption) after the completion or termination of the RLF procedure. As special case Δt21=0 and/or Δt22=0. But if the signal quality measured on cell 11 is equal to or above the threshold, H, (as determined by the wireless device 10 or the radio network node), then the radio network node performs the following task:

Does not change the BW of RS in cell 11, i.e. keep on transmitting RS over first bandwidth. Typically cell 11 transmits RS using reduced BW (first BW e.g. BW2) unless there is DRX ON for at least one wireless device in the cell 11. For example during T1 as shown in FIG. 3 the RS are transmitted over reduced BW because no wireless device 10 has triggered or is expected to trigger the RLF procedure.

In a further embodiment, the radio network node may determine that the signal strength or quality experienced by one or more wireless devices is below the threshold and indicates to the first radio network node the need to increase the CRS bandwidth in at least one of the first and the second radio network node.

For example, MeNB determines RLF for the wireless device 10 on the radio link with the served by SeNB, and instructs SeNB to increase its CRS bandwidth; SeNB receives an indication from MeNB that at least one SeNB's wireless device 10 experiences RLF and increases its CRS bandwidth; MeNB may also increase its bandwidth if the radio link quality for the wireless device 10 with MeNB is below a threshold.

In another example, the second radio network node 13 indicates via X2 a high load to the first radio network node.

In yet further embodiment, the N wireless devices, for which the radio link quality is determined to be poor, comprise the wireless device 10 with specific properties, e.g., software, hardware, or middleware release (below LTE release X), wireless devices not indicating its capability of a certain type, e.g., to determine or operate under reduced CRS bandwidth, MTC wireless devices, MTC wireless devices with specific coverage level (e.g., enhanced coverage or CE mode B), etc.

In the above embodiments the radio network node may determine the signal quality threshold, H, based on one or more following mechanisms:

In one example the radio network node obtains statistics of the signal quality measurement results reported by the wireless device 10 at which the wireless device 10 triggers radio link failures and uses them to set the value of H. For examples such statistics can be obtained during field tests or during live network operation. The radio network node may set H to the reported signal quality at which X % of RLF occurs e.g. X=95%.

In another example the radio network node uses the load (Lm) in a measurement cell within the signal quality measurement bandwidth and also the load (Lt) in entire cell bandwidth to determine the value of H. The signal quality measurement bandwidth is known to the radio network node since it is configured at the wireless device 10 by the radio network node. Examples of measurement BW are 6 RBs, 50 RBs etc. The radio network node may determine the load for each resource block over cell BW or within the measurement BW by receiving load information from the cell e.g. over X2 interface between network nodes, internally if the cell is served by the radio network node etc. Typically the radio network node configures the signal quality measurement BW to be equal to BW2 (e.g. reduced BW) when RS muting is used in the network. Examples of load are average DL transmit power per resource block (RB) in the cell, average DL bit rate or throughput per resource block in the cell etc. For example the value of H=F(G, Lm, Lt, K) where G is a fixed value (e.g. G=−10 dB, K is a scaling factor, where a special case is K=1). As an specific example H=G+K*log 10(Lt/Lm). The signal quality is measured over measurement BW but radio link monitoring is performed by the wireless device 10 over the cell BW. Therefore this scheme enables the radio network node to more accurately determine when the wireless device 10 actually triggers the RLF especially if the measurement BW is smaller than the cell BW, and the cell load is not evenly distributed across the cell BW (e.g. load is different in different RBs).

Figure 6:
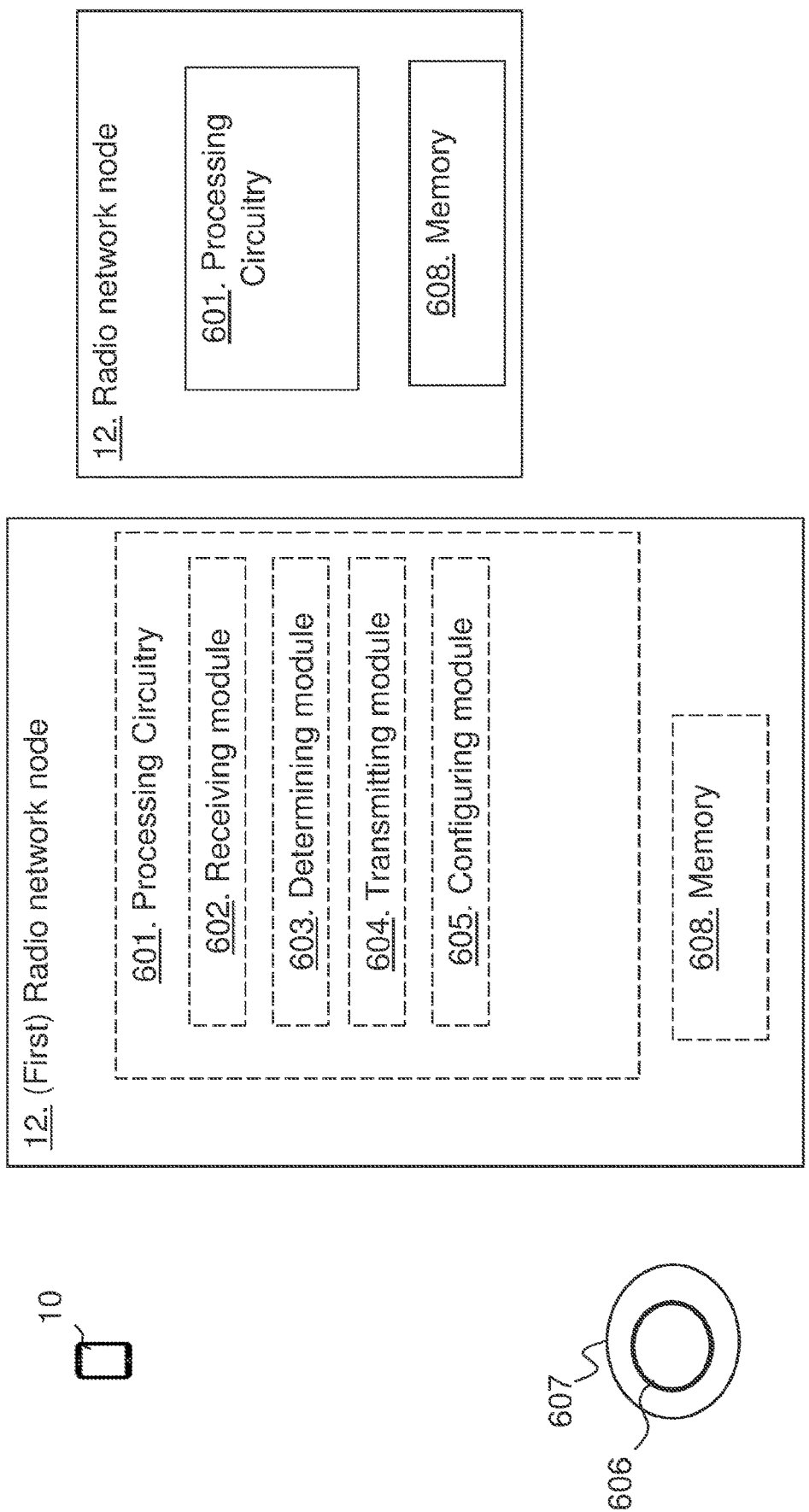
FIG. 6 is a block diagram depicting a radio network node according to embodiments herein.

FIG. 6 is a block diagram depicting the (first or second) radio network node 12, 13, in two embodiments, for handling communication of the wireless device 10 in the wireless communication network 1. The radio network node is configured to provide a serving cell for the wireless device on a lean carrier where reference signals are transmitted with a bandwidth that is variable between the first bandwidth and the second bandwidth. The second bandwidth is narrower than the first bandwidth, and the wireless device is configured with a discontinuous reception cycle. The radio network node may provide radio coverage over a first cell transmitting reference signals over the first bandwidth e.g. BW2. The wireless device 10 may be served by the radio network node. The wireless device 10 may further be served by the secondary cell as a secondary serving cell. The wireless device 10 may be served by SCell (i.e. secondary serving cell on SCC) even when SCell is deactivated i.e. SCell is the serving cell regardless of whether it is activated or deactivated.

The radio network node may comprise processing circuitry 601, e.g. one or more processors, configured to perform the methods herein.

The radio network node may comprise a receiving module 602. The radio network node, the processing circuitry 601, and/or the receiving module 602 is configured to obtain or receive the indication from the wireless device 10 or from a second radio network node, which indication indicates that the signal strength or quality of the serving cell for the wireless device 10 is below the threshold. E.g. the first radio network node 12 may receive the indication from the wireless device 10 or from the second radio network node 13, which indication indicates the signal strength or quality of the first and/or second cell for the wireless device, e.g. RSRP, RSSI or just that the value is below/above the threshold. The threshold may be related to a (possible) radio link failure, RLF.

The radio network node may comprise a determining module 603. The radio network node, the processing circuitry 601, and/or the determining module 603 may be configured to determine to transmit one or more reference signals such as CRSs over the first bandwidth or the second bandwidth based on the indication.

The radio network node may comprise a transmitting module 604, e.g. a transmitter, a transceiver or similar. The radio network node, the processing circuitry 601, and/or the transmitting module 604 is configured to transmit one or more reference signals alternately over the first bandwidth and the second bandwidth, i.e. with a bandwidth that alternates between the first and second bandwidths, in accordance with the discontinuous reception cycle configured for the wireless device 10. The reference signals may be transmitted over the first bandwidth during ON duration periods of the discontinuous reception cycle and over the second bandwidth in-between the ON duration periods of the discontinuous reception cycle. E.g. the reference signals may be transmitted over the second bandwidth or the first bandwidth as determined. The second bandwidth is different than the first bandwidth. The radio network node, the processing circuitry 601, and/or the transmitting module 604 is further configured to transmit, in response to the obtained indication, one or more reference signals over the first bandwidth, e.g. over or for at least a duration during which the wireless device will perform an RLF procedure.

The radio network node may comprise a configuring module 605. The radio network node, the processing circuitry 601, and/or the configuring module 605 may be configured to configure one or more wireless devices such as the wireless device 10 to perform one or more signal quality measurements on signals transmitted by the first cell over the first BW and the second BW.

The methods according to the embodiments described herein for the radio network node may be respectively implemented by means of e.g. a computer program product 606 or a computer program, comprising instructions, i.e., software code portions, which, when executed on at least one processor, cause the at least one processor to carry out the actions described herein, as performed by the radio network node. The computer program product 606 may be stored on a computer-readable storage medium 607, e.g. a disc, a universal serial bus (USB) stick, or similar. The computer-readable storage medium 607, having stored thereon the computer program product, may comprise the instructions which, when executed on at least one processor, cause the at least one processor to carry out the actions described herein, as performed by the radio network node. In some embodiments, the computer-readable storage medium may be a non-transitory computer-readable storage medium.

The radio network node may further comprise a memory 608. The memory comprises one or more units to be used to store data on, such as bandwidth configurations, measurements, serving cells, wireless device information, applications to perform the methods disclosed herein when being executed, and similar. Thus, the radio network node may comprise the processing circuitry and the memory, said memory comprising instructions executable by said processing circuitry whereby said radio network node is operative to perform the methods herein.

FIG. 7 is a block diagram depicting, in two embodiments, the wireless device 10 according to embodiments herein for handling communication of the wireless device 10 in the wireless communication network 1. The wireless device is configured to be served by the radio network node in the serving cell on a lean carrier where reference signals are transmitted with a bandwidth that is variable between a first bandwidth and a second bandwidth. The second bandwidth is narrower than the first bandwidth. The wireless device 10 is configured with a discontinuous reception cycle and the radio network node is configured to transmit reference signals alternately over the first bandwidth and the second bandwidth, i.e. with a bandwidth that alternates between the first and second bandwidths, in accordance with the discontinuous reception cycle configured for the wireless device, wherein e.g. the reference signals are transmitted over the first bandwidth during ON duration periods of the discontinuous reception cycle and over the second bandwidth in-between the ON duration periods of the discontinuous reception cycle.

The wireless device 10 may comprise processing circuitry 701, e.g. one or more processors, configured to perform the methods herein.

The wireless device 10 may comprise a measuring module 702. The wireless device 10, the processing circuitry 701, and/or the measuring module 702 is configured to measure a signal strength or quality of the serving cell e.g. the signal strength or quality of the first and/or secondary serving cell from the radio network node.

The wireless device 10 may comprise a transmitting module 703, e.g. a transmitter or transceiver. The wireless device 10, the processing circuitry 701, and/or the transmitting module 703 may be configured to transmit, in response to the measured signal strength or quality being below the threshold, the indication to the radio network node indicating the measured signal strength or quality. The indication may be an indication of radio link failure. The wireless device 10, the processing circuitry 701, and/or the transmitting module 703 may be configured to, when the measured signal strength or quality is below the threshold, start the RLF timer.

The wireless device 10 may comprise an assuming module 704. The wireless device 10, the processing circuitry 701, and/or the assuming module 704 is configured to receive, on the serving cell, reference signals that are assumed by the wireless device 10 to have been transmitted by the radio network node alternately over the first bandwidth and the second bandwidth, i.e. with a bandwidth that alternates between the first and second bandwidths, in accordance with the discontinuous reception cycle. The wireless device 10, the processing circuitry 701, and/or the assuming module 704 is further configured to receive, on the serving cell, the one or more reference signals, wherein the wireless device 10 is configured to assume, in response to the measured signal strength or quality being below the threshold, the one or more reference signals to have been transmitted by the radio network node over the first bandwidth. E.g. configured to assume that the transmission, from the radio network node, of one or more reference signals is made over the first bandwidth. The wireless device 10, the processing circuitry 701, and/or the assuming module 704 may be configured to assume that the transmission, from the radio network node, of one or more reference signals is made over the first bandwidth over or for at least a duration during which the wireless device will perform an RLF procedure. The wireless device 10, the processing circuitry 701, and/or the assuming module 704 may be configured to assume that the transmission, from the radio network node, of one or more reference signals is made over the first bandwidth or the second bandwidth based on the measured signal strength or quality. Thus, the wireless device 10 may adapt reception for transmission of the RS over the second bandwidth. The second bandwidth is different than the first bandwidth.

The wireless device 10 may comprise a configuring module 705. The wireless device 10, the processing circuitry 701, and/or the configuring module 705 may be configured to receive configuring information from the radio network node for setting up the wireless device 10 to perform one or more signal quality measurements on signals transmitted on the serving cell over the first BW and the second BW. The wireless device may comprise a receiving module configured to receive transmissions from the radio network node. The assuming module 704 may be configured to receive the reference signals and the one or more reference signals via the receiving module.

The methods according to the embodiments described herein for the wireless device 10 may be respectively implemented by means of e.g. a computer program product 706 or a computer program, comprising instructions, i.e., software code portions, which, when executed on at least one processor, cause the at least one processor to carry out the actions described herein, as performed by the wireless device 10. The computer program product 706 may be stored on a computer-readable storage medium 707, e.g. a disc, an USB stick, or similar. The computer-readable storage medium 707, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 may further comprise a memory 708. The memory comprises one or more units to be used to store data on, such as BW information, serving cells, applications to perform the methods disclosed herein when being executed, and similar. Thus, the wireless device 10 may comprise the processing circuitry and the memory, said memory comprising instructions executable by said processing circuitry whereby said wireless device is operative to perform the methods herein.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Any two or more embodiments described in this document may be combined in any way with each other. Furthermore, in a more general case when the wireless device may need to configure measurement period adaptively to one or more conditions, e.g., channel quality, Ês/Iot, Signal to Interference pule Noise ratio (SINR), received signal quality, total interference or interference on a specific resources or from a specific interferer(s), etc. Other non-limiting examples where the described herein methods are particularly beneficial include measurements for Discontinuous Reception (DRX) or extended DRX, and measurement s in high speed train environments.

In some embodiments a non-limiting term "wireless device" is used. The wireless device herein can be any type of UE capable of communicating with network node or another UE over radio signals. The wireless device may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. It can be any kind of network node which may comprise of a radio network node such as base station, radio base station, base transceiver station, base station controller, network controller, evolved Node B (eNB), Node B, multi-RAT base station, Multi-cell/multicast Coordination Entity (MCE), relay node, access point, radio access point, Remote Radio Unit (RRU) Remote Radio Head (RRH), a core network node (e.g., Mobility Managing Entity (MME), Self-Organizing Network (SON) node, a coordinating node, positioning node, Minimizing Drive Test (MDT) node, etc.), or even an external node (e.g., $3^{rd}$ party node, a node external to the current network), etc.

The term "radio node" used herein may be used to denote the wireless device or the radio network node.

The embodiments are applicable to single carrier as well as to multicarrier or carrier aggregation (CA) operation of the wireless device 10 in which the wireless device 10 is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The term "signaling" used herein may comprise any of: high-layer signaling, e.g., via Radio Resource Control (RRC), lower-layer signaling, e.g., via a physical control channel or a broadcast channel, or a combination thereof. The signaling may be implicit or explicit. The signaling may further be unicast, multicast or broadcast. The signaling may also be directly to another node or via a third node.

The term time resource used herein may correspond to any type of physical resource or radio resource expressed in terms of length of time. Examples of time resources are: symbol, time slot, subframe, radio frame, Transmission Time Interval (TTI), interleaving time, hyper System Frame Number (H-SFN), etc.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL) or bidirectional (e.g., Round Trip time (RTT), Reception-Transmission (Rx-Tx), etc.). Some examples of radio measurements: timing measurements (e.g., Time of Arrival (TOA), timing advance, RTT, Reference Signal Time Difference (RSTD), Synchronization Signal Time Difference (SSTD), Rx-Tx, propagation delay, etc.), angle measurements (e.g., angle of arrival), power-based measurements (e.g., received signal power, RSRP, received signal quality, RSRQ, SINR, Signal to Noise Ratio (SNR), interference power, total interference plus noise, RSSI, noise power, Channel Quality Indicator (CQI), Channel state information (CSI), precoding matrix indicator (PMI), etc.), cell detection or cell identification, beam detection or beam identification, RLM, system information reading, etc.

The term measurement performance used herein may refer to any criteria or metric which characterizes the performance of the measurement performed by a radio node. The term measurement performance is also called as measurement requirement, measurement performance requirements etc. The radio network node has to meet one or more measurement performance criteria related to the performed measurement. Examples of measurement performance criteria are measurement time, number of cells to be measured with the measurement time, measurement reporting delay, measurement accuracy, measurement accuracy with regards to a reference value (e.g. ideal measurement result) etc. Examples of measurement time are measurement period, cell identification period, evaluation period, etc. In some embodiments, the term "RS" is used, which most frequently refers to CRS but in principle may also refer to other RS types or physical signals.

In some embodiments a term bandwidth (BW) is used. Over the BW the radio network node transmits to and/or receives signal from one or more wireless devices in a cell. The bandwidth is interchangeably called as operating BW, channel bandwidth, system bandwidth, transmission bandwidth, cell bandwidth, cell transmission BW, carrier bandwidth, measurement bandwidth, maximum allowed measurement bandwidth, common bandwidth of plurality of cells on a carrier etc. The BW may also correspond to BW of specific signals (e.g. BW of any of: Sounding reference signal (SRS), CRS, Demodulation Reference Signal (DMRS), Discovery Reference Signal, synchronization signal, data channel, control channel etc). The BW may be expressed in different units. Examples of units are KHz, MHz, number of resource blocks, number of resource elements, number of subcarriers, number of physical channels, number of frequency resource units etc. The frequency channel or carrier frequency over which a RAT operates is enumerated or addressed by a channel number aka absolute radio frequency channel number (ARFCN) e.g. E-UTRA ARFCN (EARFCN) in LTE etc. In case, a signal is transmitted in a number of discontinuous in frequency RBs, the term bandwidth may also comprise the total span of all RBs of the signal.

The embodiments described herein may apply to any Radio Access Technology (RAT) or their evolution, e.g., LTE Frequency Duplex Division (FDD), LTE Time Duplex Division (TDD), LTE with frame structure 3 or unlicensed operation, UTRA, GSM, WiFi, short-range communication RAT, narrow band RAT, RAT for 5G, etc.

Figure 8A:
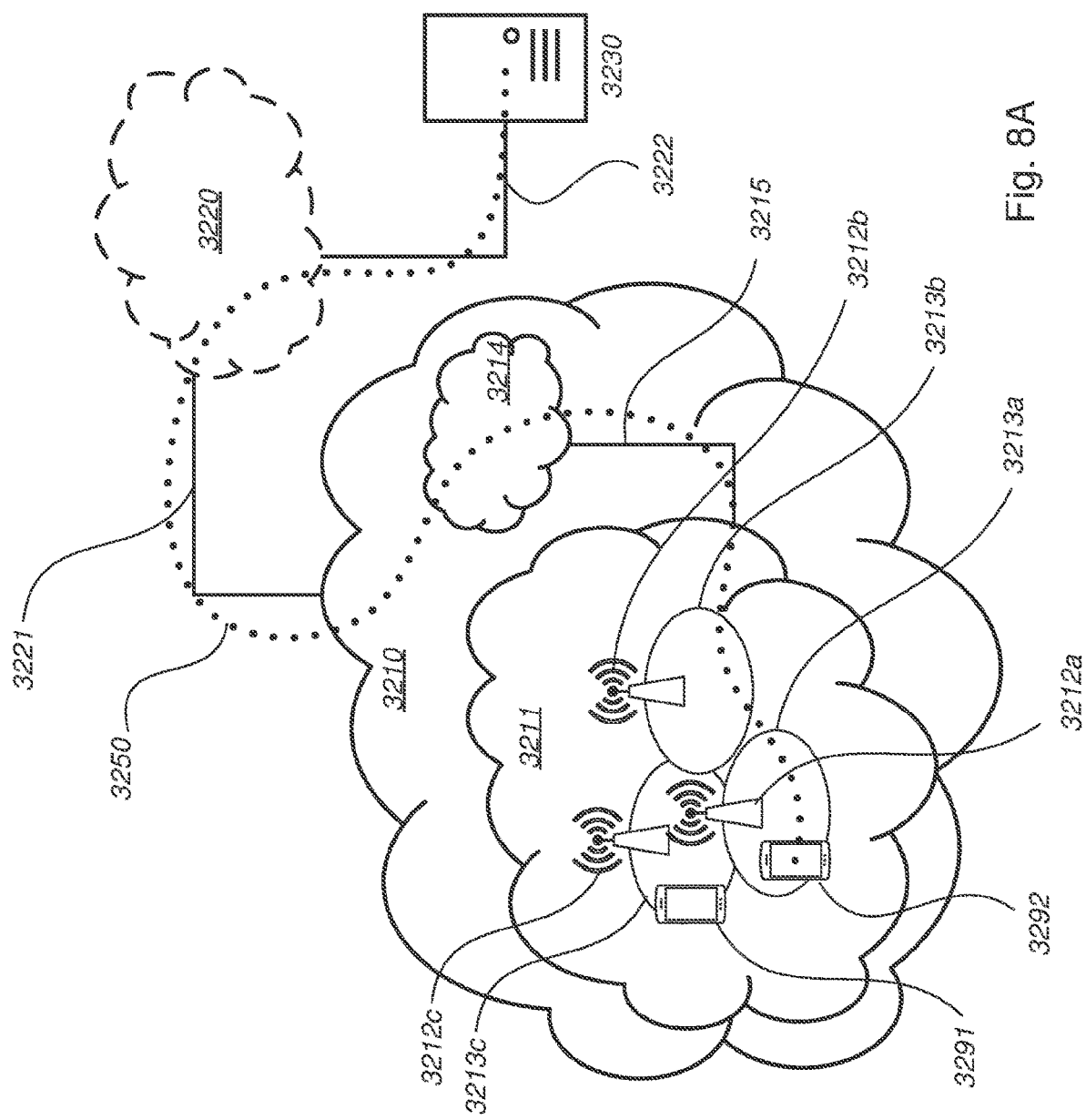
FIG. 8A schematically illustrates a telecommunication network connected via an intermediate network to a host computer.

With reference to FIG. 8A, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8A as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8B. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8B) served by the base station 3320. The communication interface 3326 may be configured to facilitate a connection 3360 to the host computer 3310. The connection 3360 may be direct or it may pass through a core network (not shown in FIG. 8B) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8B:
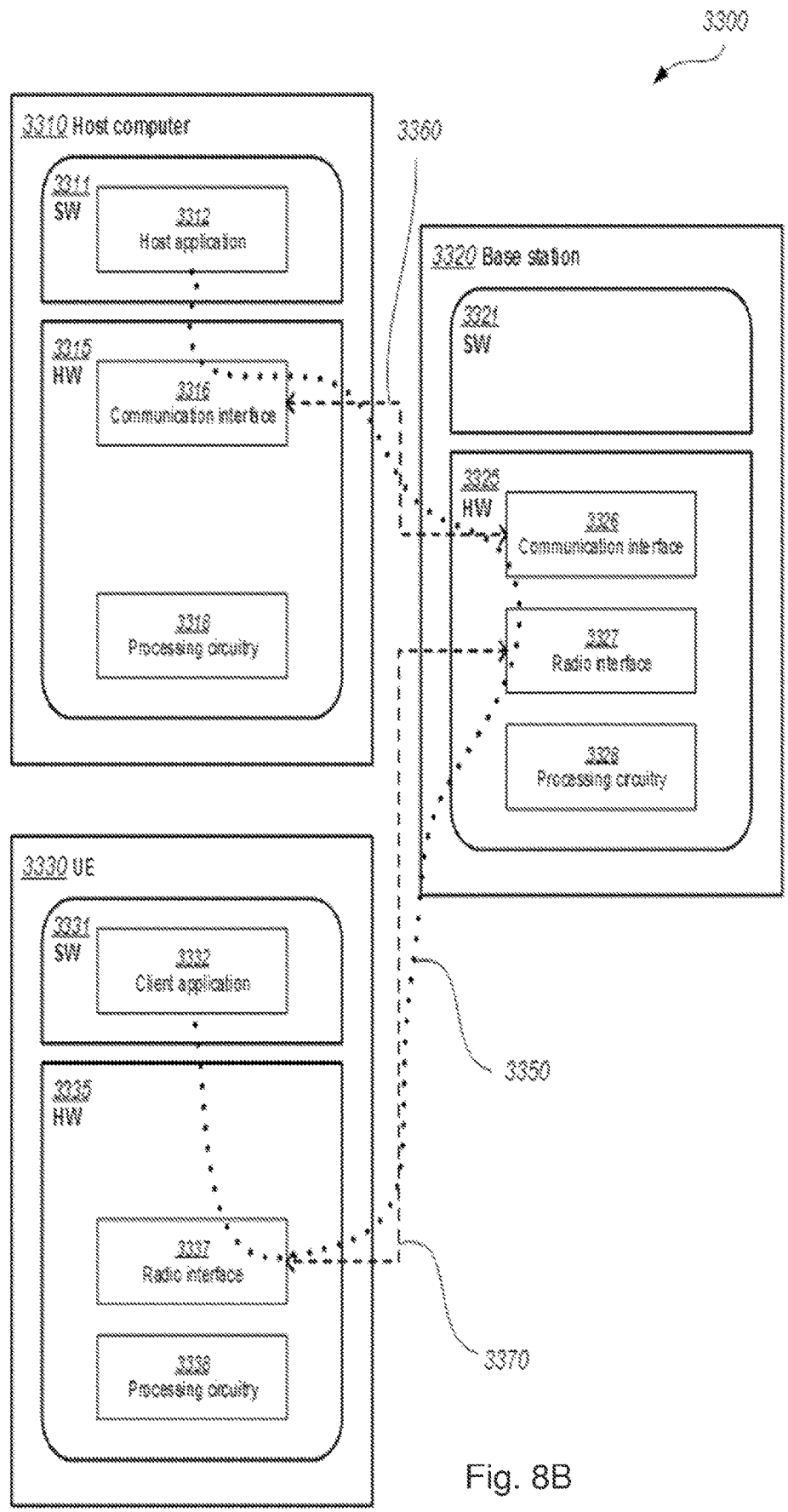
FIG. 8B is a generalized block diagram of a host computer communicating via a base station with a user equipment over a partially wireless connection.

It is noted that the host computer 3310, base station 3320 and UE 3330 illustrated in FIG. 8B may be identical to the host computer 3230, one of the base stations 3212a, 3212b, 3212c and one of the UEs 3291, 3292 of FIG. 8A, respectively. This is to say, the inner workings of these entities may be as shown in FIG. 8B and independently, the surrounding network topology may be that of FIG. 8A.

In FIG. 8B, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve usage of resources that may affect the latency and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 9, 10:
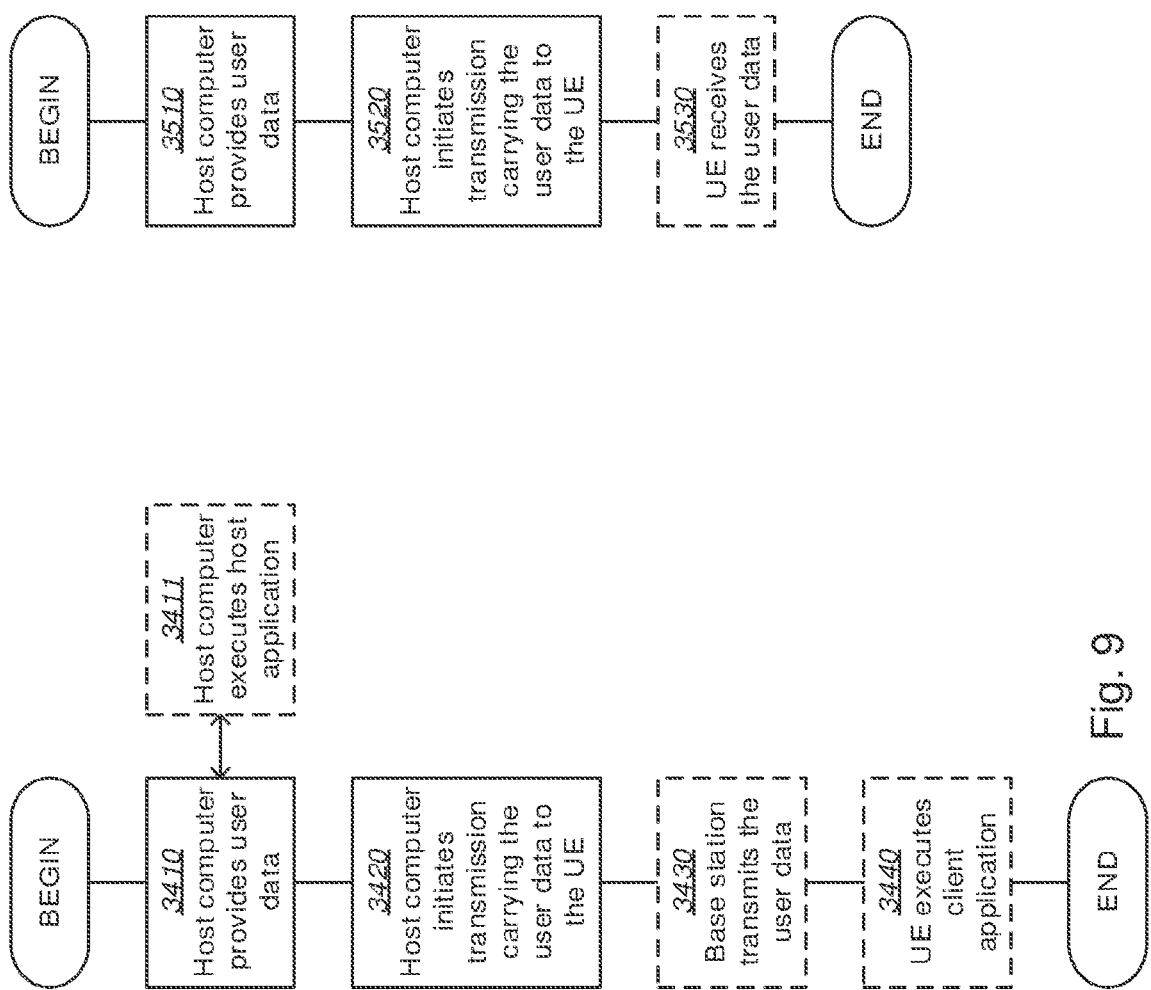

FIG. 9 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 11 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

According to an aspect it is herein provided a method performed by a radio network node for handling communication of a wireless device in a wireless communication network. The radio network node transmits reference signals over a first bandwidth. The radio network node obtains or receives an indication from the wireless device or a second radio network node, which indication indicates a signal strength or quality of a first and/or secondary serving cell for the wireless device, e.g. RSRP, RSSI or just that the value is below/above a threshold. The radio network node determines to transmit one or more reference signals over the first bandwidth or a second bandwidth based on the indication. The radio network node then transmits one or more reference signals over a second bandwidth or the first bandwidth as determined. The second bandwidth is different than the first bandwidth, and the first and second bandwidth may be preconfigured.

According to another aspect it is herein provided a method performed by a wireless device for handling communication of the wireless device in a wireless communication network. The wireless device may be served by the radio network node in a first and/or secondary serving cell and the radio network node transmits reference signals over a first bandwidth, such as CRS. The wireless device measures a signal strength or quality of the first and/or secondary serving cell from the radio network node. The wireless device transmits an indication to the radio network node indicating the measured signal strength or quality. The wireless device then assumes that a transmission, from the radio network node, of one or more reference signals is made over the first or a second bandwidth, which second bandwidth is different than the first bandwidth, based on the measured signal strength or quality.

According to yet another aspect it is herein provided a radio network node and a wireless device configured to perform the methods herein.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node for handling communication of a wireless device in a wireless communication network, wherein the radio network node is configured to provide a serving cell for the wireless device on a lean carrier where reference signals are transmitted with a bandwidth that is variable between a first bandwidth and a second bandwidth, the second bandwidth being narrower than the first bandwidth, and wherein the wireless device is configured with a discontinuous reception cycle, the method comprising:
   transmitting reference signals over a bandwidth that alternates between the first bandwidth and the second bandwidth in accordance with the discontinuous reception cycle configured for the wireless device;
   obtaining an indication from the wireless device or from a second radio network node, which indication indicates that a signal strength or quality of the serving cell for the wireless device is below a threshold; and
   transmitting, in response to the obtained indication, one or more reference signals over the first bandwidth.

2. The method according to claim 1, wherein the threshold is related to a radio link failure, RLF.

3. The method according to claim 1, wherein the transmitting the one or more reference signals over the first bandwidth is performed over at least a duration during which the wireless device will perform a radio link failure, RLF, procedure.

4. A method performed by a wireless device for handling communication of the wireless device in a wireless communication network, wherein the wireless device is served by a radio network node in a serving cell on a lean carrier where reference signals are transmitted with a bandwidth that is variable between a first bandwidth and a second bandwidth, the second bandwidth being narrower than the first bandwidth, and wherein the wireless device is configured with a discontinuous reception cycle, the method comprising:

receiving, on the serving cell, reference signals that are assumed by the wireless device to have been transmitted by the radio network node over a bandwidth that alternates between the first bandwidth and the second bandwidth in accordance with the discontinuous reception cycle;

measuring a signal strength or quality of the serving cell; and receiving, on the serving cell, one or more reference signals, wherein the wireless device assumes, in response to the measured signal strength or quality being below a threshold, the one or more reference signals to have been transmitted by the radio network node over the first bandwidth.

5. The method according to claim 4, further comprising transmitting, in response to the measured signal strength or quality being below the threshold, an indication to the radio network node indicating the measured signal strength or quality.

6. The method according to the claim 5, wherein the wireless device, when the measured signal strength or quality is below the threshold, starts a radio link failure, RLF, timer.

7. The method according to claim 4, wherein the receiving comprises assuming that the transmission, from the radio network node, of one or more reference signals is made over the first bandwidth over at least a duration during which the wireless device will perform a radio link failure, RLF, procedure.

8. A radio network node for handling communication of a wireless device in a wireless communication network, wherein the radio network node is configured to provide a serving cell for the wireless device on a lean carrier where reference signals are transmitted with a bandwidth that is variable between a first bandwidth and a second bandwidth, the second bandwidth being narrower than the first bandwidth, and wherein the wireless device is configured with a discontinuous reception cycle, and wherein the radio network node is configured to:

transmit reference signals over a bandwidth that alternates between the first bandwidth and the second bandwidth in accordance with the discontinuous reception cycle configured for the wireless device;

obtain an indication from the wireless device or from a second radio network node, which indication indicates that a signal strength or quality of the serving cell for the wireless device is below a threshold; and transmit, in response to the obtained indication, one or more reference signals over the first bandwidth.

9. The radio network node according to claim 8, wherein the threshold is related to a radio link failure, RLF.

10. The radio network node according to claim 8, wherein the radio network node is configured to transmit the one or more reference signals over the first bandwidth, in response to the obtained indication, over at least a duration during which the wireless device will perform a radio link failure, RLF, procedure.

11. A wireless device for handling communication of the wireless device in a wireless communication network, wherein the wireless device is configured to be served by a radio network node in a serving cell on a lean carrier where reference signals are transmitted with a bandwidth that is variable between a first bandwidth and a second bandwidth, the second bandwidth being narrower than the first bandwidth, and wherein the wireless device is configured with a discontinuous reception cycle, wherein the wireless device is configured to:

receive, on the serving cell, reference signals that are assumed by the wireless device to have been transmitted by the radio network node over a bandwidth that alternates between the first bandwidth and the second bandwidth in accordance with the discontinuous reception cycle;

measure a signal strength or quality of the serving cell; and receive, on the serving cell, one or more reference signals, wherein the wireless device is configured to assume, in response to the measured signal strength or quality being below a threshold, the one or more reference signals to have been transmitted by the radio network node over the first bandwidth.

12. The wireless device according to claim 11, wherein the wireless device is further configured to, in response to the measured signal strength or quality being below the threshold, transmit an indication to the radio network node indicating the measured signal strength or quality.

13. The wireless device according to the claim 12, wherein the wireless device is configured to, when the measured signal strength or quality is below the threshold, start a radio link failure, RLF, timer.

14. The wireless device according to claim 11, wherein the wireless device is configured to assume that the transmission, from the radio network node, of one or more reference signals is made over the first bandwidth over at least a duration during which the wireless device will perform RLF procedure.

\* \* \* \* \*